(12) United States Patent
Enos et al.

(10) Patent No.: US 12,364,209 B2
(45) Date of Patent: Jul. 22, 2025

(54) VERTICALLY ORIENTED PLANT GROWING SYSTEMS

(71) Applicant: LIFEPONIC SOLUTIONS, LLC, Colorado Springs, CO (US)

(72) Inventors: Michael L. Enos, Colorado Springs, CO (US); Eldon L. Goates, Colorado Springs, CO (US); Marshall Lee James, Monument, CO (US)

(73) Assignee: LIFEPONIC SOLUTIONS, LLC, Colorado Springs, CO (US)

( * ) Notice: Subject to any disclaimer, the term of this patent is extended or adjusted under 35 U.S.C. 154(b) by 0 days.

(21) Appl. No.: 17/973,503

(22) Filed: Oct. 25, 2022

(65) Prior Publication Data

US 2023/0125260 A1    Apr. 27, 2023

Related U.S. Application Data

(60) Provisional application No. 63/262,987, filed on Oct. 25, 2021.

(51) Int. Cl.
*A01G 9/02* (2018.01)

(52) U.S. Cl.
CPC .................. *A01G 9/023* (2013.01)

(58) Field of Classification Search
CPC ......... A01G 9/022; A01G 9/023; A01G 9/028
See application file for complete search history.

(56) References Cited

U.S. PATENT DOCUMENTS

| | | | | |
|---|---|---|---|---|
| 4,779,378 A | * | 10/1988 | Mason, Jr. ............. | A01G 9/023 47/83 |
| 5,533,302 A | * | 7/1996 | Lynch .................... | A01G 9/023 47/66.5 |
| 6,470,625 B1 | * | 10/2002 | Byun ..................... | A01G 9/023 47/82 |
| 6,612,073 B1 | * | 9/2003 | Powell ................... | A01G 9/023 47/65.5 |
| 6,840,008 B1 | * | 1/2005 | Bullock ................. | A01G 9/023 47/82 |

(Continued)

FOREIGN PATENT DOCUMENTS

| | | |
|---|---|---|
| CN | 108283141 A | 7/2018 |
| CN | 212306431 U | 1/2021 |

(Continued)

OTHER PUBLICATIONS

PCT International Search Report and the Written Opinion of the International Searching Authority dated Mar. 27, 2023, PCT Application No. PCT/US2022/047776.

(Continued)

*Primary Examiner* — Joshua J Michener
*Assistant Examiner* — Aaron M Rodziwicz
(74) *Attorney, Agent, or Firm* — David F Dockery; The Navitas Intellectual Propery Group LLC

(57) ABSTRACT

Plant growth structures and components of plant growth structures. The vertically-oriented plant growth structures include a plurality of growth basket receptacles that are in fluid communication with a fluid conduit to provide water to growth baskets placed within the growth basket receptacles. The plant growth structures provide water flow to the plants and a high density of plants in a relatively small growing area.

28 Claims, 17 Drawing Sheets

(56) References Cited

U.S. PATENT DOCUMENTS

| | | |
|---|---|---|
| 7,055,282 B2 | 6/2006 | Bryan, III |
| 7,516,574 B2 | 4/2009 | Gottlieb et al. |
| D658,537 S | 5/2012 | Simmons |
| 8,776,433 B2 | 7/2014 | Huang et al. |
| D752,478 S | 3/2016 | Cudmore et al. |
| D760,622 S | 7/2016 | Ogden |
| 9,521,811 B2 | 12/2016 | Peterson et al. |
| D792,807 S | 7/2017 | Bryan, III |
| D795,129 S * | 8/2017 | Dillard .................. D11/143 |
| D795,738 S | 8/2017 | Xing |
| 9,968,039 B2 | 5/2018 | Graber |
| 10,004,186 B2 | 6/2018 | Daugirdas |
| 10,136,594 B2 | 11/2018 | Blank |
| D858,344 S | 9/2019 | Hendrick et al. |
| 10,485,184 B2 | 11/2019 | King |
| 10,499,575 B2 | 12/2019 | Stoltzfus et al. |
| 10,531,615 B2 | 1/2020 | Santillana et al. |
| 10,645,883 B2 | 5/2020 | Cudmore et al. |
| D896,690 S | 9/2020 | Adolf et al. |
| 10,772,270 B2 | 9/2020 | Linneberg |
| 10,791,688 B2 | 10/2020 | Walters |
| 10,842,084 B2 | 11/2020 | Brusatore et al. |
| 10,932,425 B2 | 3/2021 | Buuren et al. |
| D922,249 S | 6/2021 | Rouxel |
| 11,076,542 B1 | 8/2021 | Bryan, III |
| 11,206,774 B2 | 12/2021 | Sperry et al. |
| 11,297,783 B2 | 4/2022 | DeFoor |
| 11,304,377 B2 | 4/2022 | Stevens |
| 2003/0196376 A1* | 10/2003 | Taylor .................... A01G 9/023 47/66.6 |
| 2007/0144069 A1* | 6/2007 | Gottlieb ................ A01G 9/023 47/82 |
| 2008/0216403 A1* | 9/2008 | Schmidt ................ A01G 9/023 47/83 |
| 2010/0132255 A1* | 6/2010 | Webber .................. A01G 9/023 47/29.1 |
| 2010/0146854 A1* | 6/2010 | Cannon .................. A01G 9/023 47/82 |
| 2010/0229464 A1* | 9/2010 | Wilkes ................... A01G 9/023 47/82 |
| 2012/0167460 A1* | 7/2012 | Omidi .................... A01G 9/023 47/65.7 |
| 2013/0118074 A1 | 5/2013 | Fulbrook |
| 2013/0145690 A1* | 6/2013 | Cannon .................. A01G 9/023 47/66.7 |
| 2016/0057951 A1* | 3/2016 | Van Twist ............. A01G 9/021 47/62 A |
| 2016/0353674 A1* | 12/2016 | Keats ..................... A01G 9/023 |
| 2017/0000049 A1 | 1/2017 | Cox |
| 2017/0055473 A1 | 3/2017 | Baker |
| 2017/0105372 A1 | 4/2017 | Bryan, III |
| 2017/0202161 A1* | 7/2017 | Eckert ................... A01G 9/028 |
| 2017/0354096 A1* | 12/2017 | Xing ..................... A01G 9/028 |
| 2019/0166778 A1 | 6/2019 | Hendrick et al. |
| 2019/0269081 A1 | 9/2019 | Whitworth et al. |
| 2020/0008378 A1* | 1/2020 | Van Buuren ......... A01G 27/005 |
| 2020/0029508 A1 | 1/2020 | Losada |
| 2020/0236864 A1* | 7/2020 | Henry .................. A01G 27/003 |
| 2020/0315100 A1* | 10/2020 | Kiessling .............. A01G 9/023 |
| 2021/0227755 A1* | 7/2021 | Moffitt .................. A01G 9/023 |
| 2021/0227763 A1* | 7/2021 | Bryan, III ............. A01G 9/023 |
| 2021/0392834 A1 | 12/2021 | Rouxel |
| 2021/0400892 A1* | 12/2021 | Rouxel .................. A01G 31/06 |
| 2022/0132762 A1* | 5/2022 | Madeux ................ A01G 9/023 47/62 R |
| 2022/0174881 A1* | 6/2022 | Tompkin ............... F21V 23/003 |
| 2022/0256791 A1 | 8/2022 | Stevens |
| 2023/0200321 A1* | 6/2023 | Van Buuren .......... A01G 9/023 47/62 C |

FOREIGN PATENT DOCUMENTS

| | | | |
|---|---|---|---|
| WO | 2009109761 A1 | 9/2009 | |
| WO | 2011150365 A2 | 12/2011 | |
| WO | WO-2015118413 A2 * | 8/2015 | ........... A01G 27/003 |
| WO | 2016162856 A1 | 10/2016 | |
| WO | 2018013162 A1 | 1/2018 | |
| WO | 2020051271 A1 | 3/2020 | |
| WO | 2020076729 A1 | 4/2020 | |
| WO | 2021010882 A1 | 1/2021 | |
| WO | WO-2021204921 A1 * | 10/2021 | ............ A01G 31/06 |

OTHER PUBLICATIONS

Sylvainh9. "Hydroponic 3D Printed Tower" 1-8. [online]. Oct. 28, 2020; [Retrieved on Dec. 27, 2022]. Retrieved from the internet: pp. 1-8.

* cited by examiner

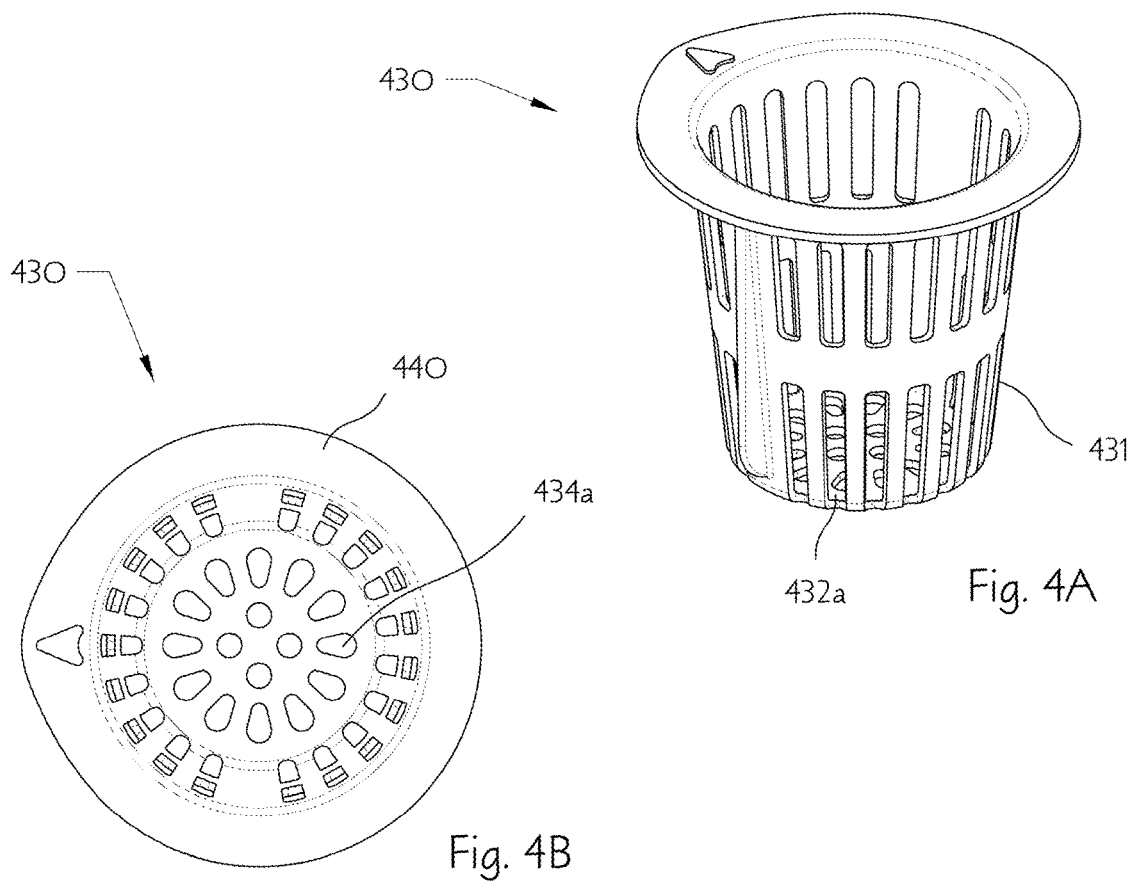
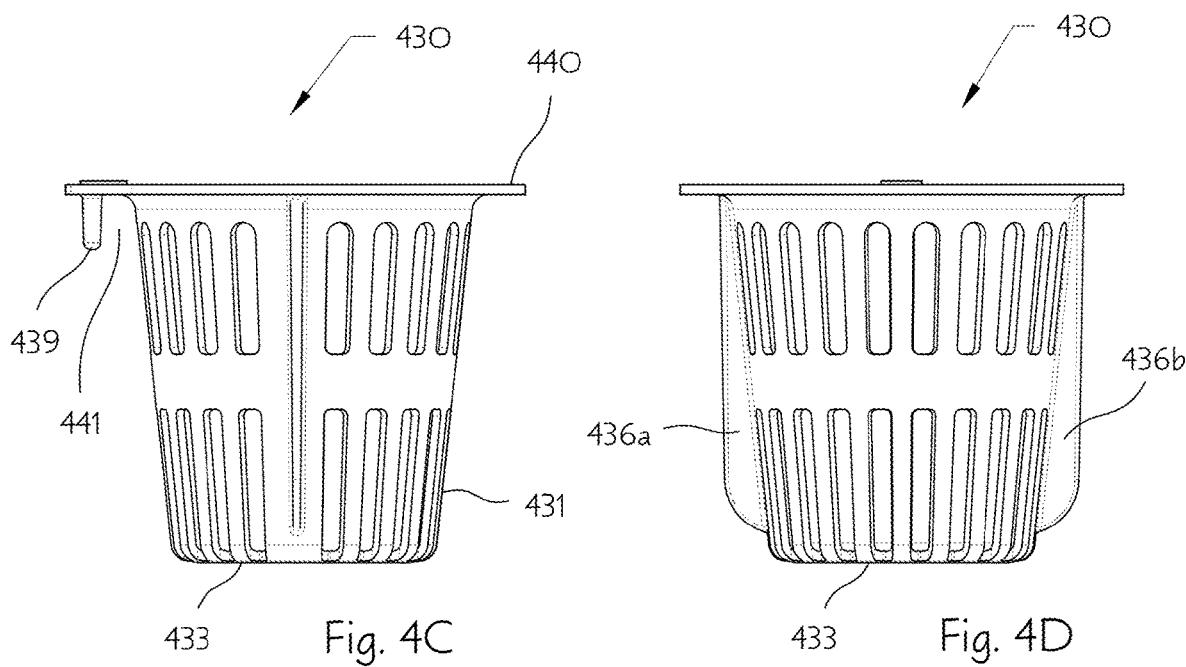
Fig. 4A
Fig. 4B
Fig. 4C
Fig. 4D

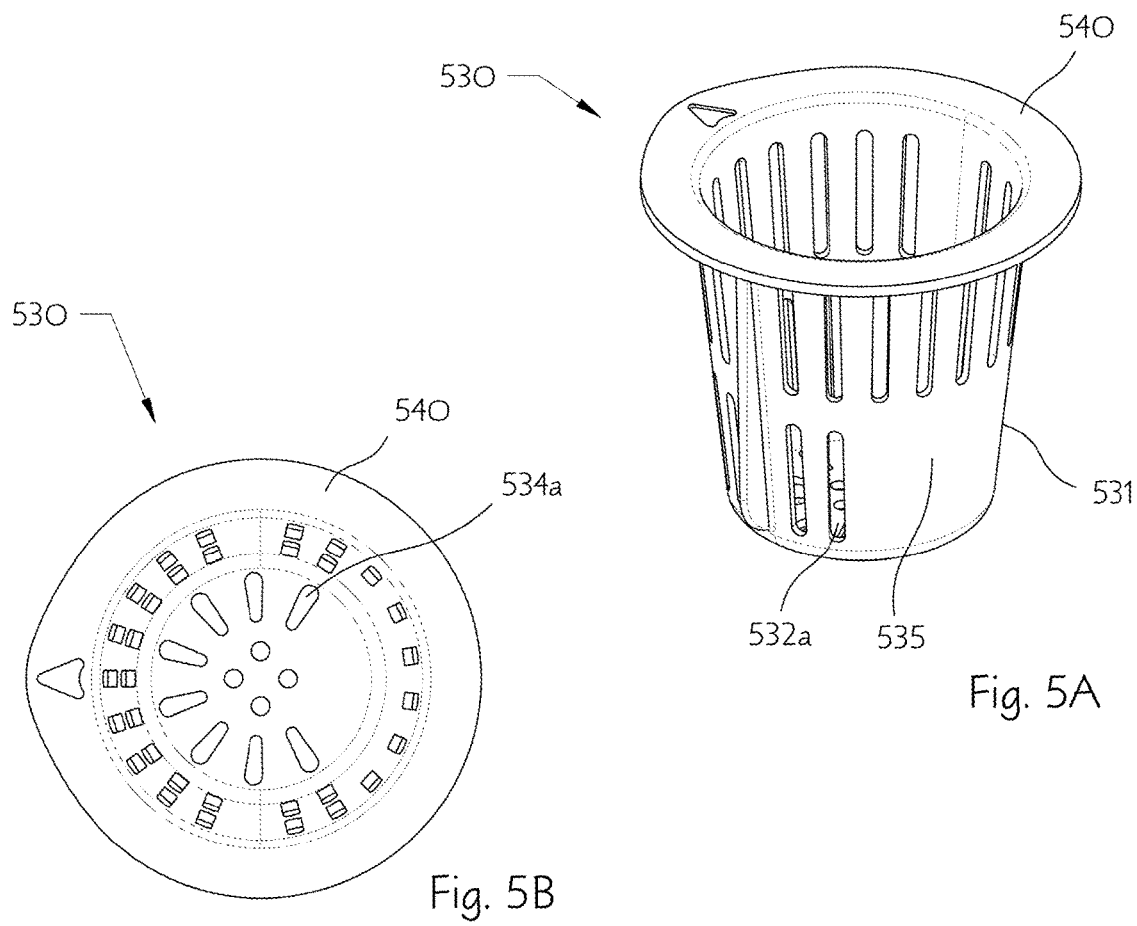
Fig. 5A
Fig. 5B
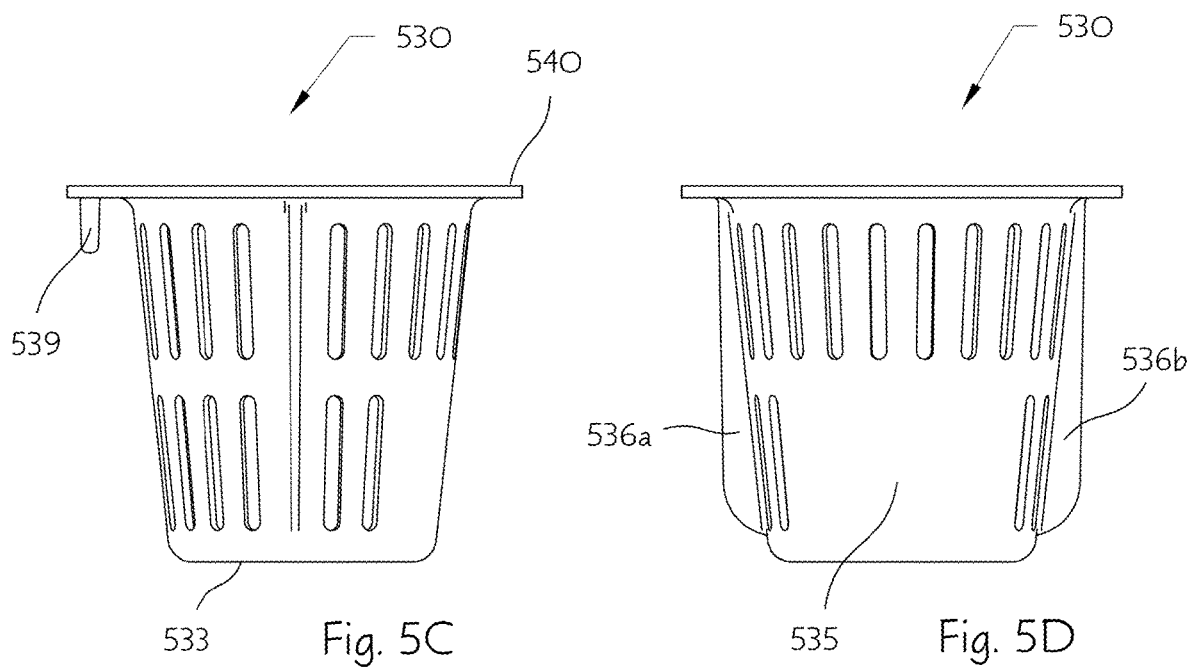
Fig. 5C
Fig. 5D

VERTICALLY ORIENTED PLANT GROWING SYSTEMS

CROSS-REFERENCE TO RELATED APPLICATIONS

This application claims the priority benefit of U.S. Provisional Patent Application No. 63/262,987 by Enos and filed on Oct. 25, 2021, which is incorporated herein by reference in its entirety.

FIELD

This disclosure relates to the field of plant growing systems, particularly to vertical plant growing towers that utilize a reduced amount of water for plant growth as compared to conventional growing methods.

BACKGROUND

Hydroponics is a type of horticulture and a subset of hydroculture which involves growing plants (usually crops) by using mineral nutrient solutions in an aqueous solvent. Terrestrial plants may grow with their roots exposed to the nutritious liquid, or, in addition, the roots may be physically supported by an inert medium such as peat, perlite, gravel, or other substrates.

Hydroponics offers many advantages as compared to traditional farming methods. Hydroponics enable plants to be grown indoors and using a smaller footprint for the same quantity of plants. Further, there is a significant decrease in water usage. For example, to grow 1 kilogram (2.2 lb) of tomatoes using common farming methods typically requires about 400 liters (88 imp gal; 110 U.S. gal) of water; using hydroponics, 1 kilogram (2.2 lb) of tomatoes typically requires about 70 liters (15 imp gal; 18 U.S. gal. Since hydroponics requires much less water to grow produce, it is possible for people in harsh environments with little accessible water to grow their own food.

SUMMARY

In one embodiment, a plant growth structure that includes a plurality of planter modules is disclosed. The planter modules include a central section having a top end, a bottom end and an outer wall defining an interior fluid conduit therethrough for the passage of a liquid. At least three growth basket receptacles are disposed in a substantially horizontal plane around a periphery of the central section, the growth basket receptacles having an outer diameter and being configured so that when a growth basket is placed in a growth basket receptacle, at least a lower portion of the growth basket is in fluid communication with the fluid conduit. The peripheral density of the growth basket receptacles disposed around the central section is at least about 0.6. As a result, the density of plants that may be grown within the area of the plant growth structure is increased as compared to known plant growth structures.

The foregoing embodiment is subject to a number of characterizations and refinements that may be implemented alone or in any combination. Such characterizations and refinements are set forth in the following description and in the claims filed with the application.

In another embodiment, a kit for the construction of a plant growth system is disclosed. The kit includes at least a first planter module, the first planter module including a central section having a top end, a bottom end and an outer wall defining an interior fluid conduit therethrough for the passage of a liquid. A plurality of growth basket receptacles are disposed around a periphery of the central section, where the growth basket receptacles are in fluid communication with the interior fluid conduit.

In one characterization, at least a first riser tube module is provided in the kit. The first riser tube module includes a top end, a bottom end and an outer wall defining an interior fluid conduit for the passage of a liquid. The outer wall has a periphery that is substantially the same cross-section as the outer periphery of the central section of the planter module. The riser tube module is configured to operatively and securely attach to the bottom end of the planter module. The riser tube module outer wall is free from growth basket receptacles.

In another characterization, at least a first plant support module is provided in the kit. The first plant support module includes a central section having a top end, a bottom end and an outer wall defining an interior fluid conduit for the passage of a liquid therethrough. A plant support tray is operatively disposed around a periphery of the central section, the plant support tray including a top surface that extends outwardly from the central section and is configured to support portions of a plant thereupon. The central section is configured to operatively and securely attach to the bottom end of the at least first planter module.

The foregoing embodiment of a kit for the construction of a plant growth structure is subject to a number of additional characterizations and refinements that may be implemented alone or in any combination. Such characterizations and refinements are set forth in the following description and in the claims filed with the application.

In another embodiment, a plant growth structure is disclosed that includes a plurality of planter modules. The planter modules include a central section having a top end, a bottom end, and a sidewall defining an interior fluid conduit therethrough for the passage of a liquid. At least a first growth basket receptacle is disposed on a periphery of the central section, the first growth basket receptacle having an outer diameter and being in fluid communication with the fluid conduit. At least a first flow guide is disposed on the interior fluid conduit, the first flow guide including a projection extending outwardly from the fluid conduit to direct liquid into a growth basket placed in the growth basket receptacle.

The foregoing embodiment of a plant growth structure is subject to a number of additional characterizations and refinements that may be implemented alone or in any combination. Such characterizations and refinements are set forth in the following description and in the claims filed with the application.

In another embodiment, a plant growth basket is disclosed. The plant growth basket is configured to be placed within a growth basket receptacle, e.g., in a vertically-oriented plant growing system. The growth basket includes a sidewall, a bottom wall, a top rim and a top orifice for receiving plant growing matter within the interior of the growth basket. A plurality of fluid apertures are disposed in the sidewall and a plurality of fluid apertures are disposed in the bottom wall. The growth basket includes at least first and second flanges disposed along an exterior surface of the growth basket sidewall.

The foregoing embodiment of a plant growth basket is subject to a number of additional characterizations and refinements that may be implemented alone or in any

DESCRIPTION OF THE DRAWINGS

FIGS. 4A-4D illustrate an embodiment of a plant growth basket according to an embodiment of the present disclosure.

FIGS. 5A-5D illustrate an embodiment of a plant growth basket according to an embodiment of the present disclosure.

DESCRIPTION

Disclosed herein are vertically oriented plant growth structures, e.g., for the hydroponic growth of plants. The plant growth structures include a plurality of growth basket receptacles, e.g., receptacles that are configured to secure a growth basket containing a growing medium such as perlite, peat, clay aggregate, etc. holding seeds or a live plant. Also disclosed are structural elements and components, e.g., modules, that are configured to supply an aqueous liquid, e.g., nutrient-enhanced water, to the seed and/or live plants contained in the growth baskets in an efficient manner.

The plant growth structures disclosed herein may be fabricated as a unitary structure or may be fabricated from several components that are interconnected together, e.g., as a modular system. In certain embodiments, the plant growth structure is constructed in a modular fashion, e.g., by interconnecting several modules to construct the vertically oriented plant growth structure.

Figure 1A:
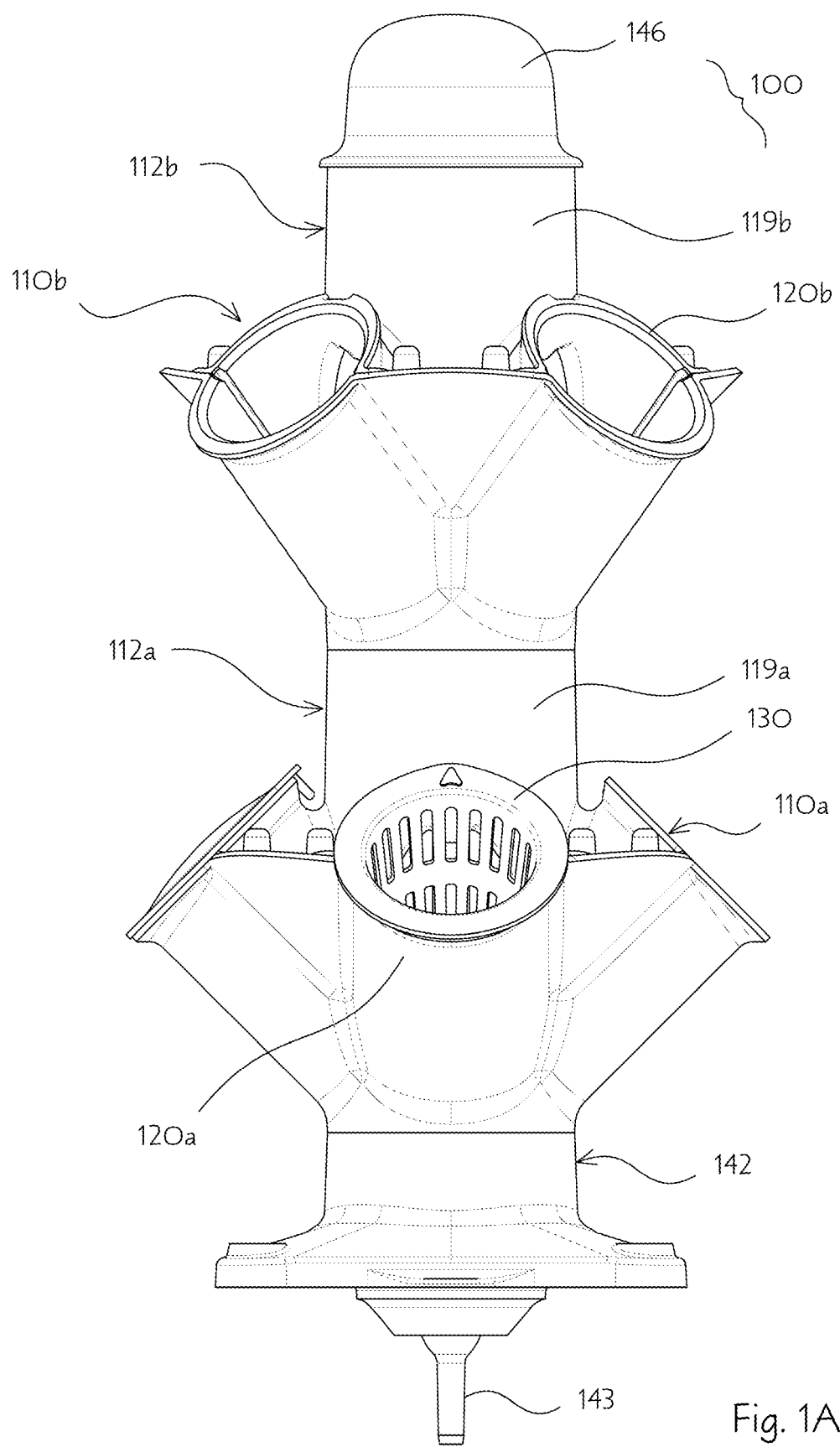
FIGS. 1A-1C illustrate an embodiment of a plant growth structure according to an embodiment of the present disclosure.
Figure 1B:
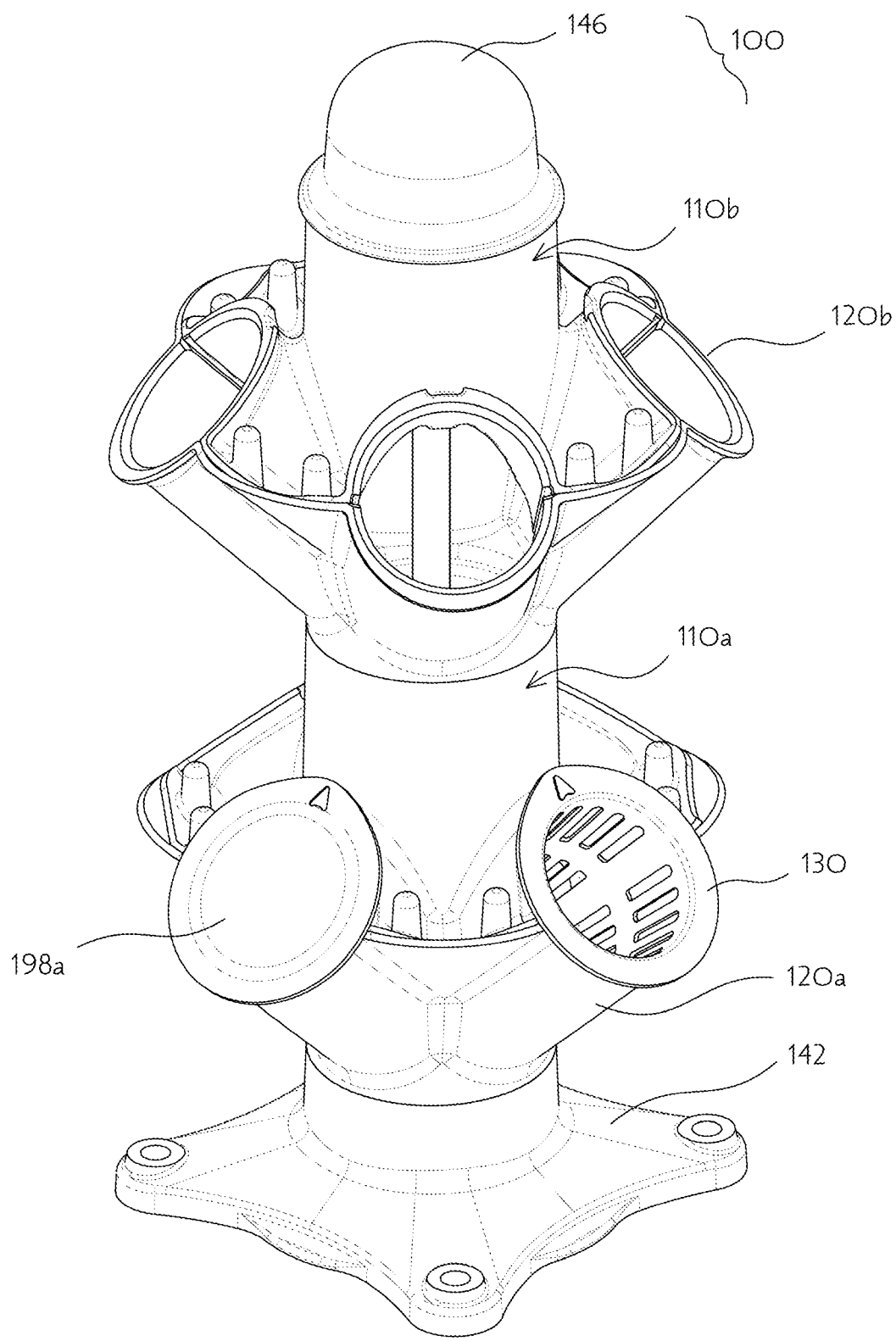
Figure 1C:
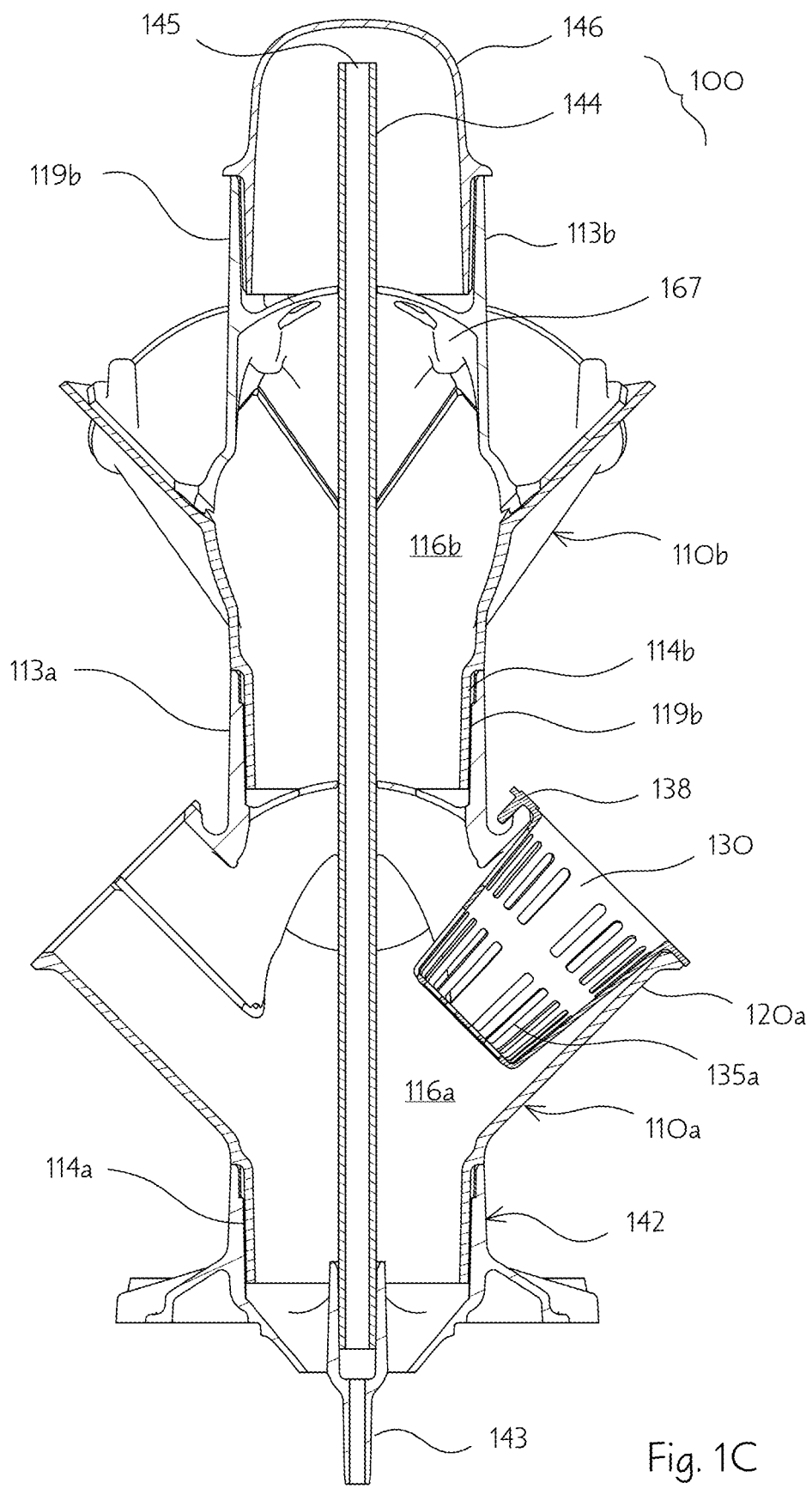

FIGS. 1A-1C illustrate a plant growth structure according to an embodiment of the present disclosure. Specifically, FIG. 1A illustrates a front view, FIG. 1B illustrates a perspective view and FIG. 1C illustrates a cross-sectional view of the plant growth structure 100. The plant growth structure 100 illustrated in FIGS. 1A-1C is a vertically oriented plant growth structure, i.e., the structure 100 has a major axis in the vertical direction when the structure 100 is operatively oriented for the growth of plants. The plant growth structure 100 includes two vertically spaced planter modules 110a/110b that each include a plurality of growth basket receptacles, such as growth basket receptacles 120a/120b. The growth basket receptacles are disposed around a central support section 112a/112b of each planter module 110a/110b, e.g., are disposed around a periphery of the central sections. As illustrated in the figures, the central support section of the planter module is substantially round, i.e., has a substantially round cross-section. However, the present disclosure is not limited to a particular shape for the central sections, which may have an oval cross-section or a polygonal cross-section such as a square cross-section. In any event, the growth basket receptacles illustrated in the figures extend outwardly and upwardly from the central sections 112a/112b, e.g., at an upward angle of from about 35° to about 55° such as at an angle of about 45°. The growth basket receptacles are configured, e.g., sized an shaped, to operatively secure a growth basket, e.g., growth basket 130, within the receptacles. As is illustrated in FIG. 1C, the growth basket 130 comprises an attachment element 138, e.g., a notch, disposed on a top rim 140 of the growth basket. The attachment element 138 may be mated to a corresponding notch disposed on an upper edge of the plant growth basket receptacle 120a to secure the basket to the receptacle.

A base module 142 provides support for the plant growth structure 100 and includes a fluid inlet 143 that is configured to receive a liquid feed, e.g., nutrient-enhanced water, that is pumped through the fluid inlet 143. As illustrated in FIG. 1C, the fluid inlet 143 is in fluid communication with a liquid feed tube 144 that extends upwardly through the central sections 110a/110b and that terminates below a cap 146 that is operatively affixed to the top of the plant growth structure 100, e.g., is affixed to a top end 113b of the planter module 110b. As a result, when a liquid is pumped into the fluid inlet 143 and moves upwardly through the liquid feed tube 144, the liquid will exit the feed tube 144 through tube aperture 145 and will flow into a fluid conduit 116b within the planter module 110b. As used herein, a fluid conduit is a pathway that enables a liquid to flow, e.g., under the influence of gravity, from an upper portion of a structure or module to a lower portion of the structure or module. Portions of a fluid conduit may be defined by an inner surface of the central sections, and by fluid apertures that may be disposed within the central sections. In any event, the fluid conduit is configured to deliver water to the seeds or plants disposed in the growth baskets.

For example, the fluid conduit 113b within the central section 112b of the planter module 110b is in fluid communication with the fluid conduit 113a within the central section 112a of the planter module 110a. As a result, liquid may exit the liquid feed tube 144 and flow downwardly, e.g., under the force of gravity, through the fluid conduit 116b and into the fluid conduit 116a. As is described in more detail below, the aqueous liquid flow may be generally directed to the interior of the sidewalls 119a/119b of the central sections 112a/112b, e.g., so that the aqueous liquid flows down the interior of the sidewalls 119a/119b. As is best seen in FIG. 1C, as the aqueous liquid passes along the interior of the sidewalls of the central sections, the liquid will contact the lower interior portion 135 of the growth basket 130. Thus, the aqueous liquid will reach the roots of a plant that is contained in the growth basket 130. Any aqueous liquid that is not captured by the plants within the growth baskets may continue to flow out of the bottom of the plant growth structure 100, e.g., through the base 142, upon which the liquid may be captured for recycle.

The embodiment of a plant growth structure illustrated in FIGS. 1A-1C is for purposes of illustration and the present disclosure is not limited to the particular configuration illustrated therein. For example, the plant growth structure 100 includes two plant growth modules 110a/110b, each having four growth basket receptacles disposed around a periphery of the plant growth modules. However, the plant growth modules disclosed herein may include one, two, three or more growth basket receptacles disposed around the central section. Further, the plant growth structure 100 illustrated in FIGS. 1A-1C includes two plant growth modules 110a/110b that are operatively connected and supported by a base module 142 and sealed at the top with a cap 146. However, the plant growth structures disclosed herein may include a single plant growth module or may include any number of vertically arranged plant growth modules. See FIGS. 8A-8B, for example.

Further, the embodiment of a plant growth structure illustrated in FIGS. 1A-1C includes growth basket receptacles disposed about the periphery in a generally horizontal plane. While this is convenient for the present disclosure, the present disclosure is not limited to the particular configuration illustrated therein. For example, for access to light and for a pleasing visual effect, the growth basket receptacles may be disposed about the periphery of the central section in a spiral pattern going both around and up the central section, or in an offsetting pattern with every other receptable vertically displaced up or down.

In one refinement of a plant growth structure according to the present disclosure, the number of growth basket receptacles disposed around the central sections, e.g., on the periphery of the central sections in substantially the same horizontal plane, is very high. Stated another way, the number of growth basket receptacles that may be placed around a central section containing a fluid conduit may be increased in relation to known plant growth structures. As a result, the number of plants that may be grown simultaneously per unit area is increased.

As illustrated in FIGS. 1A-1C, four growth basket receptacles are disposed around the central section in a manner to permit liquid flowing through fluid conduit to reach the lower portions of the growth baskets. In this construction, the growth basket receptacles are closely spaced, e.g., the outer side edges of the growth basket receptacles are essentially in contact. One way to characterize the spacing of the growth basket receptacles is using a peripheral density of the growth basket receptacles disposed around the periphery of the central section. As used herein, the peripheral density is defined as the combined outer diameters of the growth basket receptacles times the number of growth basket receptacles, divided by the length around the periphery of the central section, e.g., around the circumference of round central section. For example, if four growth basket receptacles are disposed around the central section and each growth basket has an outer diameter of about 2 inches, the combined growth basket receptacle diameters is about 8 inches. If the central section is round, e.g., having a substantially round cross-section, and has an outer diameter of about 2.5 inches, the periphery, e.g., the circumference, is about 7.85 inches, and the value of the peripheral density is about 1.02. The closer the value is to one, the higher the peripheral density of the growth basket receptacles. In one characterization, the peripheral density is at least about 0.6, such as at least about 0.7, such as at least about 0.8 or even at least about 0.9. In one characterization, the peripheral density is at least about 0.95. In contrast, and merely by way of example, a planter module having a round central section with a diameter of about 4.5 inches will have a circumference of about 24.67 inches. If four growth basket receptacles having an outer diameter of about 2 inches are disposed around the central section, the peripheral density would be about 0.57.

Figure 2A:
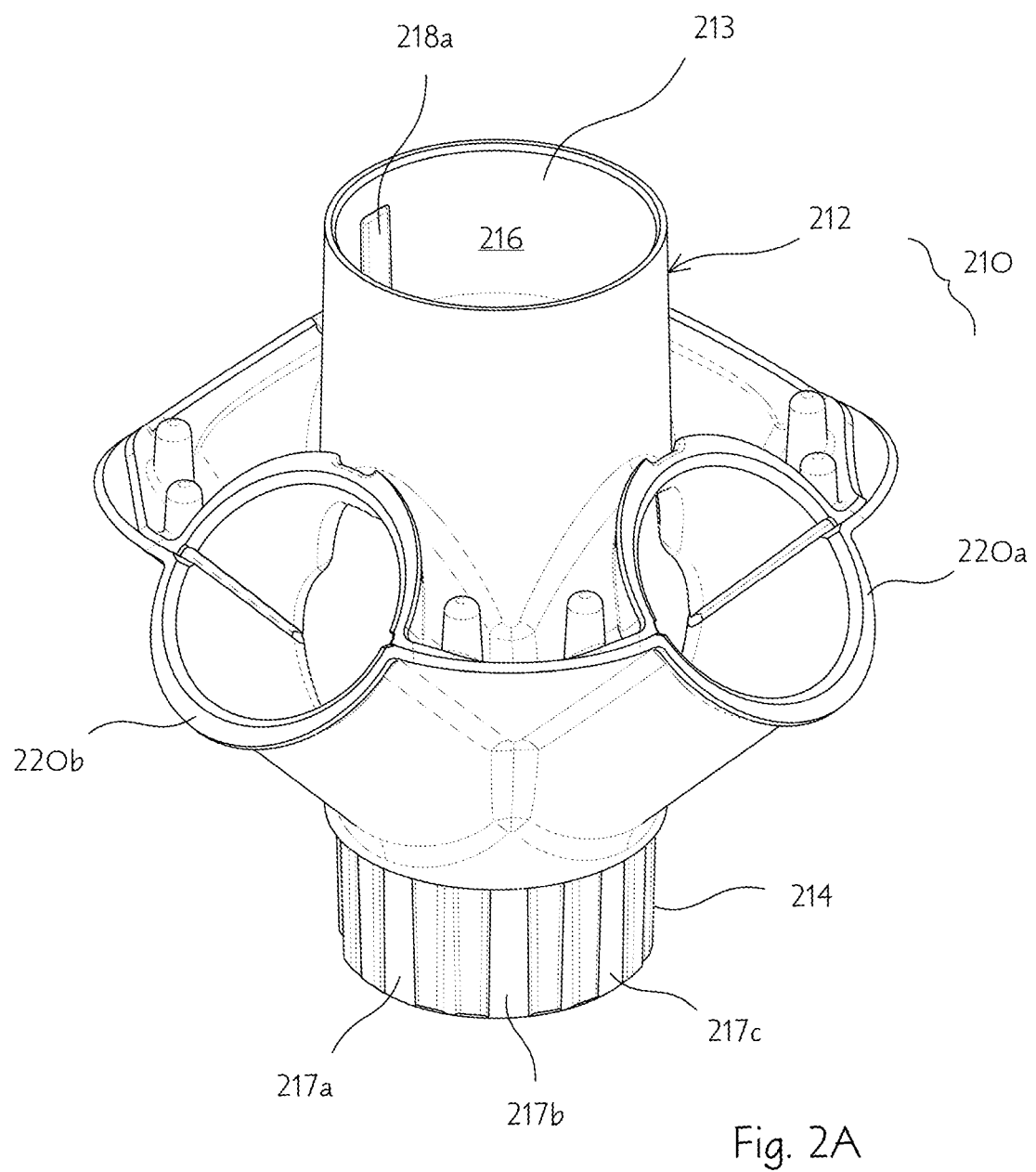
FIGS. 2A-2D illustrate an embodiment of a planter module according to an embodiment of the present disclosure.
Figure 2B:
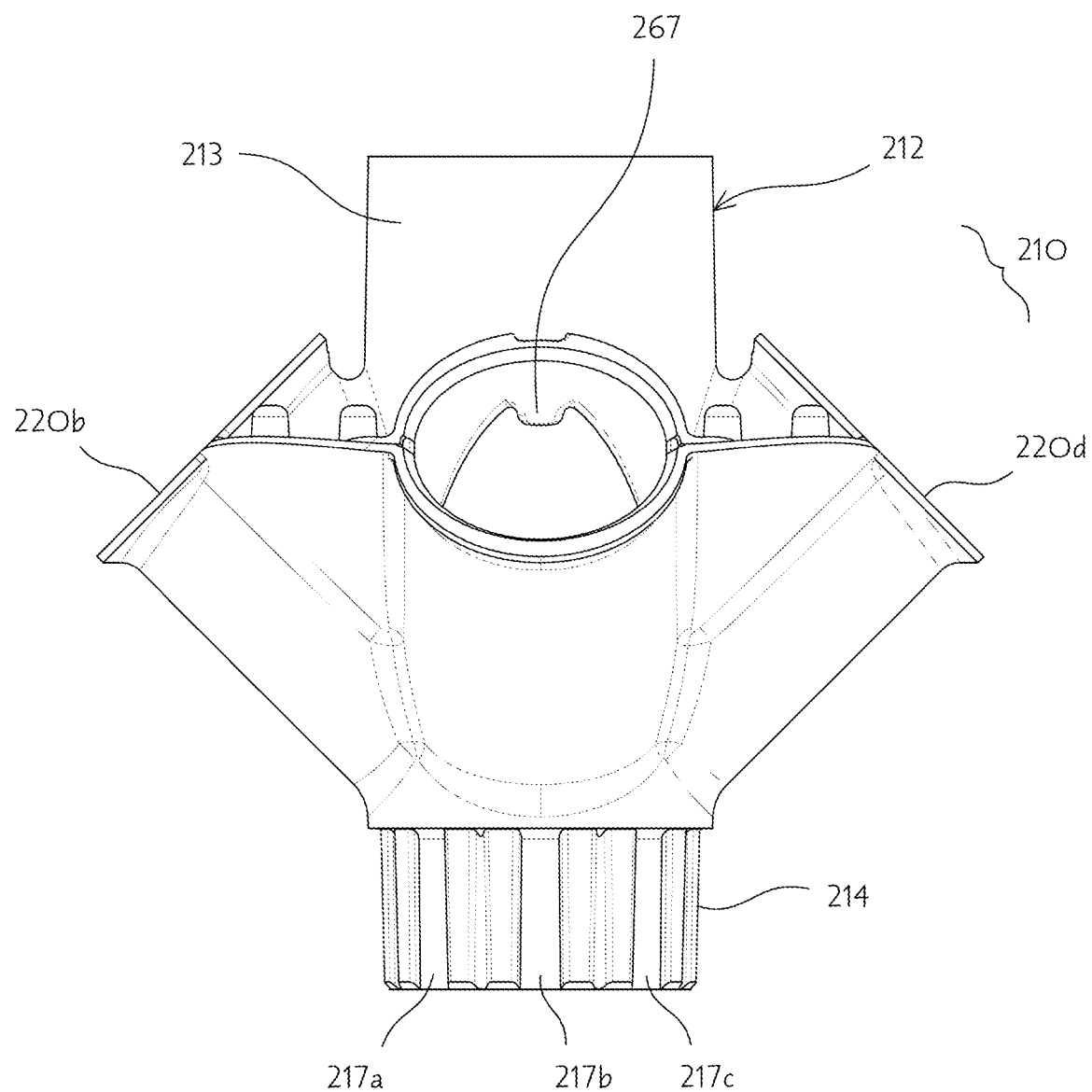
Figure 2C:
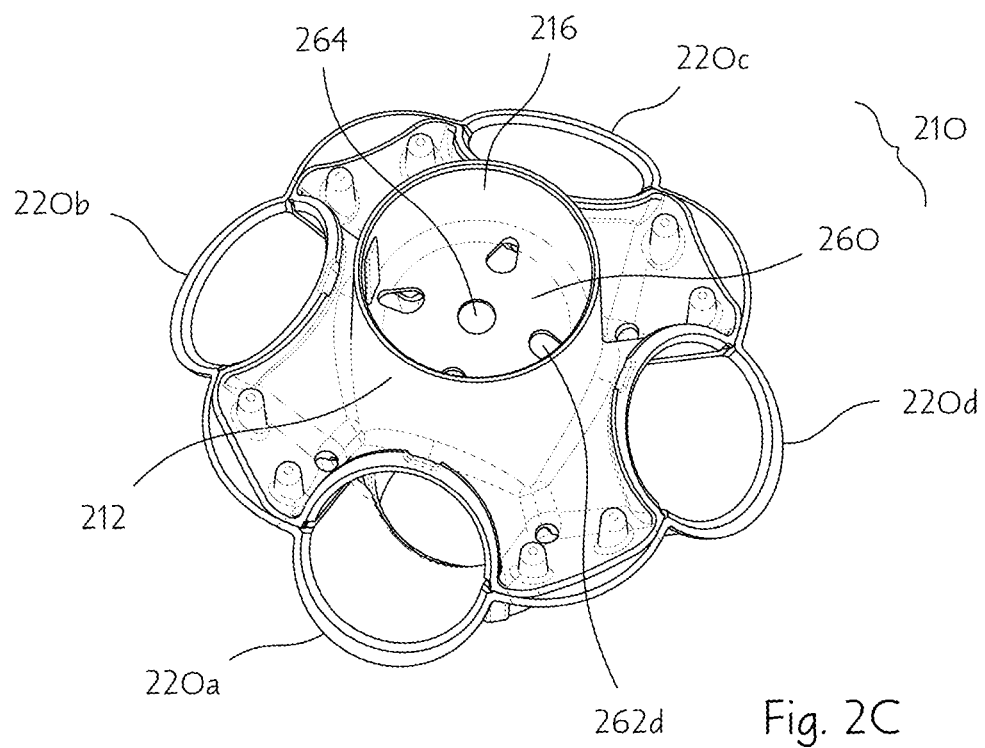
Figure 2D:
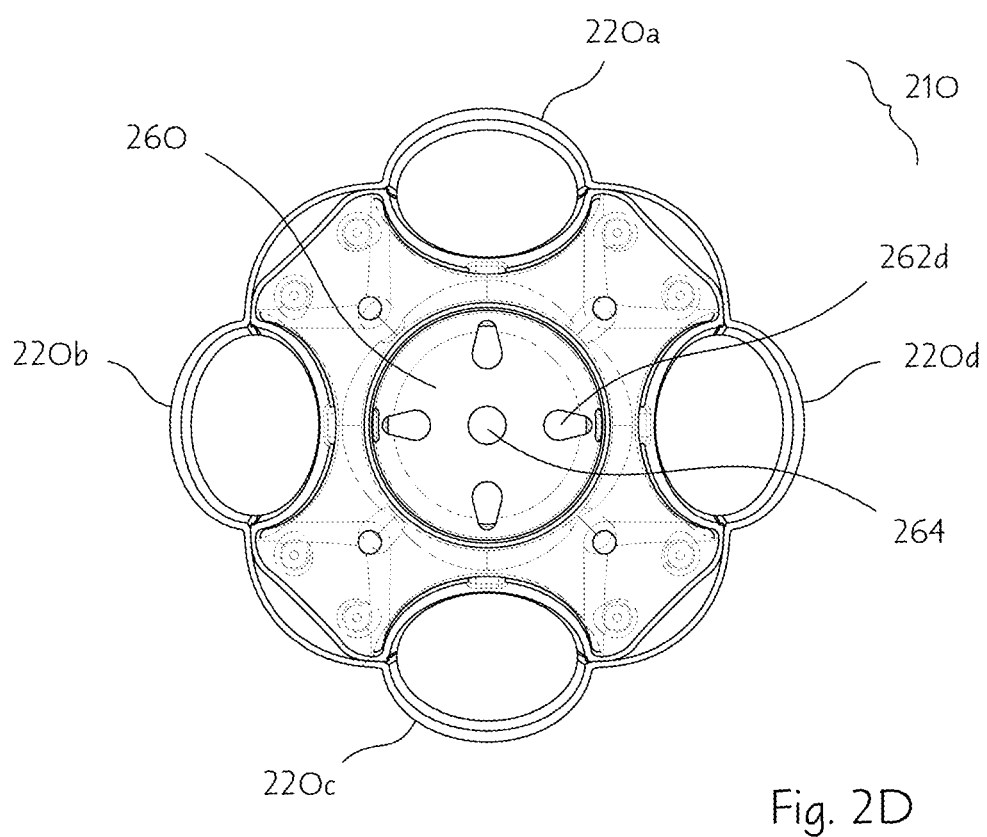

The plant growth structures disclosed herein may be fabricated as a single, unitary structure. In some embodiments of the present disclosure, the plant growth structure may be assembled from a plurality of independent modules that may be operatively connected to form the plant growth structure. Such a modular approach may facilitate ease of shipping, e.g., to a consumer, and may also enable a consumer to construct the plant growth structure in a variety of configurations. FIGS. 2A to 2D illustrate an embodiment of a planter module that may be utilized is such a modular configuration. Specifically, FIG. 2A illustrates a perspective view of a planter module 210, FIG. 2B illustrates a front view of the planter module, FIG. 2C illustrates a top view of the planter module and FIG. 2D illustrates a bottom view of the planter module.

The planter module 210 includes a plurality of growth basket receptacles 220a/220b/220c/220d disposed around a central section 212, e.g., disposed around a periphery of the section 212. The growth basket receptacles 220a/220b/220c/220d extend outwardly and upwardly from the central section 212, e.g., at an angle of from about 35° to about 55° such as at an angle of about 45°. The growth basket receptacles are configured, e.g., sized an shaped, to operatively secure a growth basket within the receptacles. See FIG. 1C.

As particularly illustrated in FIGS. 2A and 2B, the central section 212 includes a top end 213, e.g., disposed above the growth basket receptacles, and a bottom end 214, e.g., disposed generally below the growth basket receptacles. To facilitate the modular assembly of two or more planter modules, the bottom end 214 is configured to operatively attach to a top end of a similarly constructed planter module. As illustrated, the bottom end 214 is configured to slide within a top end, e.g., top end 213, of a planter module disposed below planter module 210. For example, the bottom end 214 may have an outer diameter that is close to the inner diameter of the top end 213 so that the bottom end 214 may be tightly fit within a top end of a lower planter module in a plant growth structure. In the configuration illustrated in FIGS. 2A and 2B, the outer periphery of the bottom end 214 includes a plurality of notches such as notches 217a/217b/217c disposed around the periphery. These notches are configured, e.g., sized and shaped, to operatively mate with one or more splines, e.g., spline 218a, in an adjacent planter module to secure the planter module 210 to an adjacent planter module. In one refinement, the notches are equally spaced around the periphery of the bottom end 214. For example, the notches may be spaced around the periphery separated by about 90°, e.g., four total notches, or by about 60°, e.g., six total notches. In one particular characterization, notches are separated by about 45°, e.g., about 8 total notches around the periphery. As is disclosed below, such a construction may enable growth basket receptacles in vertically spaced planter modules to be offset by about 45°, e.g., to facilitate the capture of light by the plants placed in the growth basket receptacles.

Although illustrated as including splines 218a in a top end 213 and notches 217a/217b/217c in a bottom end 214 of the central section 212, it will be appreciated that the placement of the mating splines and notches may be reversed, i.e., where the top end includes notches and the bottom end includes mating splines. Other means for securing two adjacent planter modules and for providing an angular offset of adjacent planter modules will occur to those of skill in the art.

FIGS. 2C and 2D illustrate that the central section 212 includes a fluid conduit 216, i.e., a fluid pathway, which enables the passage of a liquid through the central section 212 from the top end 213 to the bottom end 214, e.g., by gravity induced flow. A flow direction plate 260 extends across the inner sidewall of the central section 212, e.g., extends across the fluid conduit 216. The flow direction plate 260 includes a plurality of fluid apertures, such as fluid aperture 262d, disposed along an outer periphery of the flow direction plate 260. The fluid apertures are disposed in vertical alignment with, e.g., disposed over, a growth basket receptacle. For example, fluid aperture 262d is aligned with growth basket receptacle 220d. As a result, liquid flowing through the fluid apertures will impinge upon the lower portion of a growth basket that is disposed within a growth basket receptacle. See FIG. 1C. As illustrated in FIGS. 2C and 2D, the fluid apertures have a teardrop shape, i.e., being oblong with one end of the fluid aperture having a narrower width than the opposite end. As illustrated in FIGS. 2C and 2D, the end of the aperture with the narrower width is disposed directly adjacent to the inner wall of the central section 212. Although illustrated as having a teardrop shape, it will be appreciated that the fluid apertures may be round, oval, square, etc. provided that the apertures provide a fluid pathway through the flow direction plate 260, e.g., near the outer edges of the flow direction plate.

The flow direction plate 260 illustrated in FIGS. 2C-2D also includes a central aperture 264 to enable the passage of a liquid feed tube through the flow direction plate. See FIG. 1C. As is illustrated more clearly in FIG. 10 below, the flow direction plate 260 may have a non-planar shape, e.g., convex shape, to direct the flow of a liquid that impinges on the plate to the fluid apertures disposed on the outer edge of the flow direction plate.

Figure 3A:
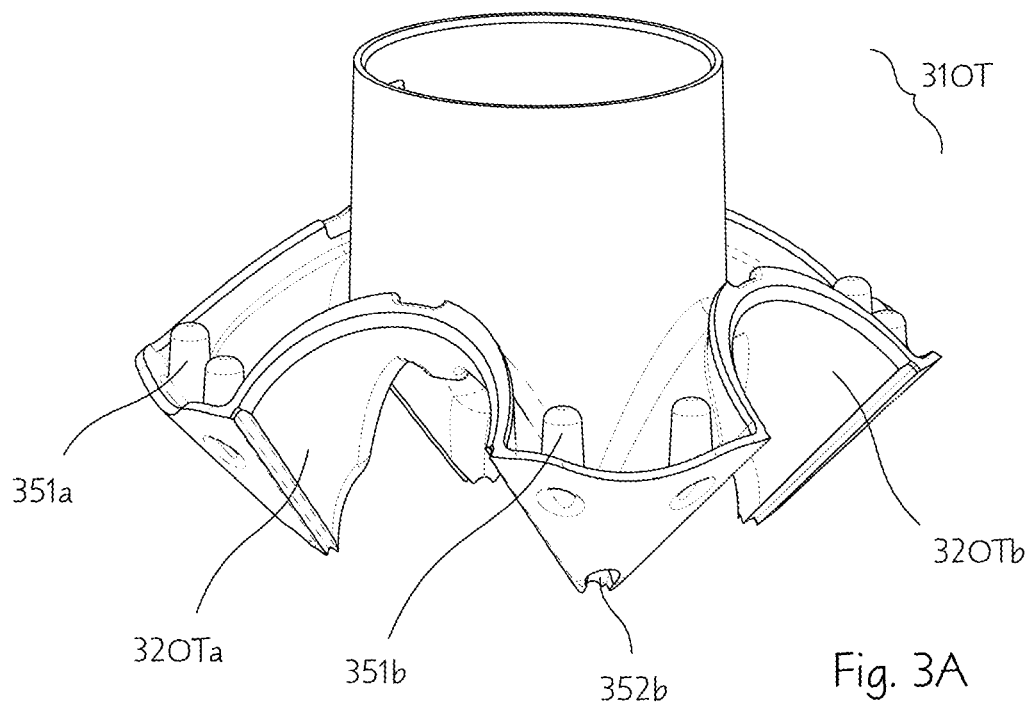
FIGS. 3A-3D illustrate an embodiment of a planter module that is fabricated from two sections according to an embodiment of the present disclosure.
Figure 3B:
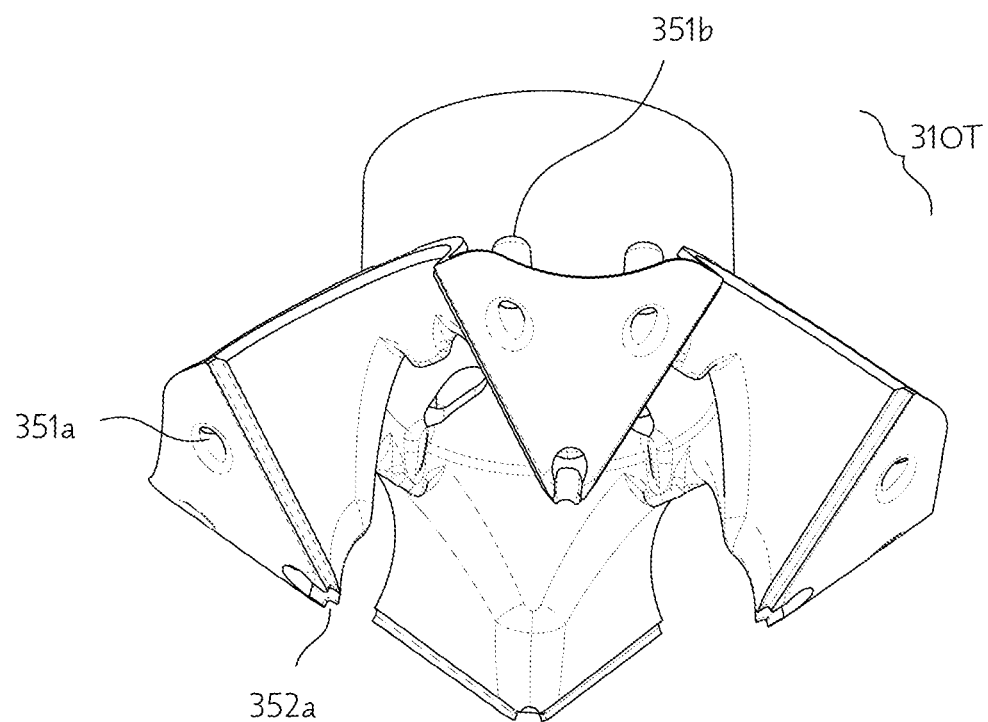
Figure 3C:
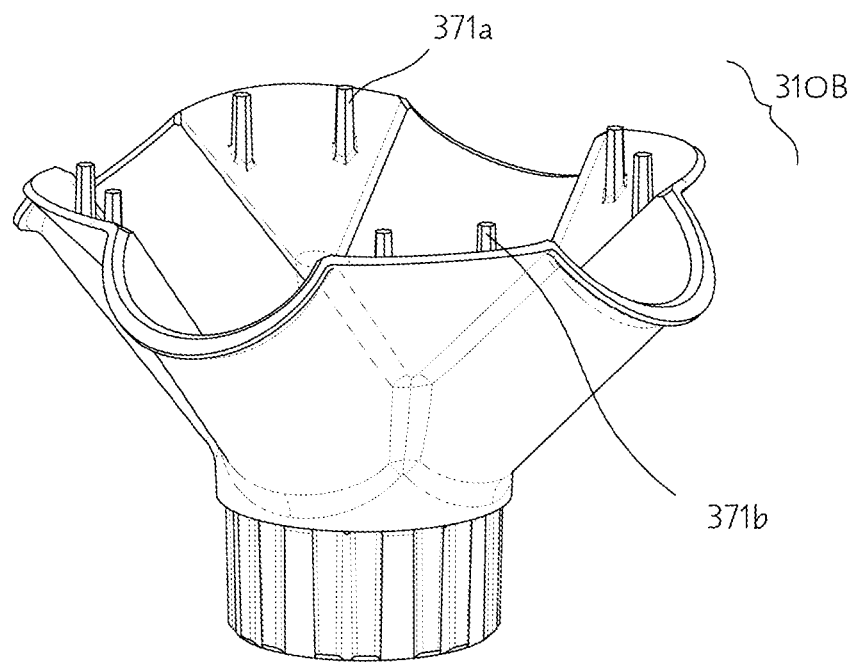
Figure 3D:
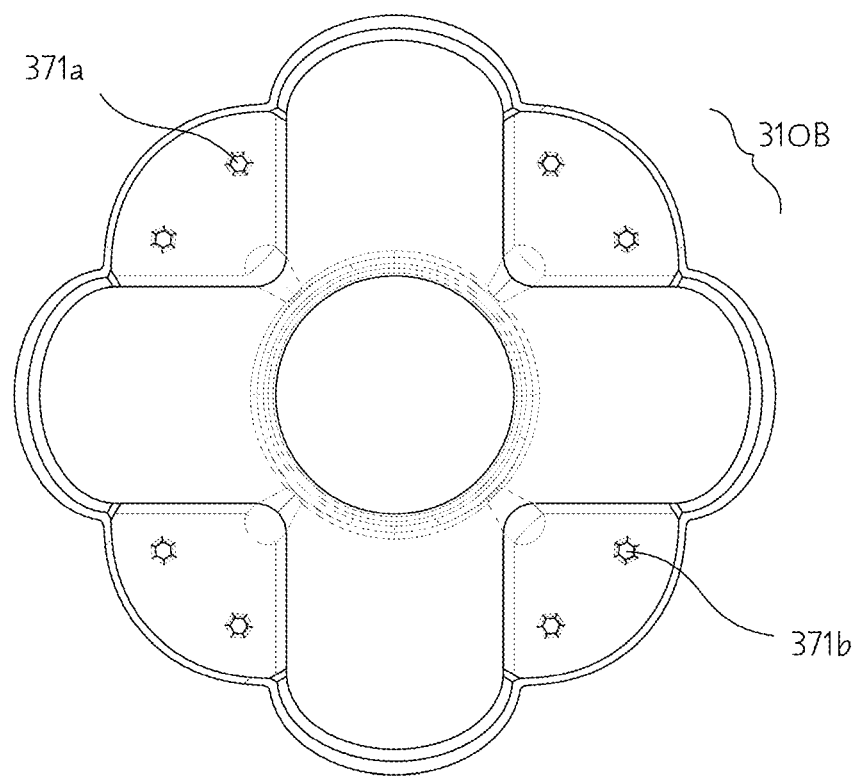

The planter modules disclosed herein may be fabricated as a single body, e.g., as a singles section. In one refinement, the planter modules are fabricated from two sections, e.g., a top section and a bottom section, that are operably attached to form the planter module. FIGS. 3A-3D illustrate several views of the top section and bottom section according to one such construction. Specifically, FIGS. 3A and 3B illustrate a top section 310T of a planter module and FIGS. 3C and 3D illustrate a bottom section 310B of the planter module. When operatively attached, the two sections 310A/310B form a complete planter module, e.g., as illustrated in FIGS. 2A-2D.

The top section 310T and the bottom section 310B may be operatively and securely attached using a variety of means such as fasteners, etc. In one refinement, the top section 310T and the bottom section 310B may be irreversibly attached, e.g., by using an adhesive, ultrasonic welding, etc. In another refinement, the two sections 310T/310B may be reversibly attached, e.g., in a manner such that a consumer may attach and detach the two sections without damaging the planter module. In this manner a consumer may disassemble the planter module, e.g., for cleaning, and then re-assemble the planter module by re-attaching the two sections. As illustrated in FIGS. 3A-3D, the two sections 310T/310B are operatively attached by mating a plurality of pin receptacles, e.g., pin receptacles 351a/351b, disposed in the top planter module section 310T with a plurality of pins, e.g., vertically extending pins 371a/371b, disposed in the bottom planter module section 310B. For example, an outer diameter of the pins 371a/371b may be substantially similar to the inner diameter of the pin receptacles 351a/351b so that pins and pin receptacles may be secured by a tight fit, e.g., a friction fit. It is believed that by mating the vertically-extending pins with the pin receptacles, the two sections 310T/310B will be securely attached and will provide structural rigidity to a vertically-oriented plant growth structure constructed using the planter module.

FIGS. 3A and 3B also illustrate a plurality of fluid capture apertures, e.g., fluid capture apertures 352a/352b, disposed between the top sections of the growth basket receptacles. For example, fluid capture aperture 352b is disposed between growth basket receptacle top sections 320Ta and 320Tb. When the sections 310T and 310B are operatively attached to form a planter module, the fluid capture apertures will enable liquid that inadvertently spills or leaks along the exterior of the planter module to be returned to the fluid conduit to reach lower planter modules or to be recycled. See FIG. 1C.

As is discussed above, the planter modules disclosed herein include one or more growth basket receptacles, e.g., disposed around the central section. The growth basket receptacles are configured, e.g., sized and shaped, to secure a growth basket within the growth basket receptacles. As is known to those skilled in the art, plants are grown within the growth basket receptacles such as by placing a growing medium, e.g., soil or peat, within the growth baskets and planting one or more seeds in the growing medium. Often, a consumer will plant one or more seeds in the growing medium and allow the seeds to germinate before placing the growth basket in a growth basket receptacle.

FIGS. 4A-4B illustrate an embodiment of a growth basket according to the present disclosure. Specifically, FIG. 4A illustrates a perspective view of the growth basket 430, FIG. 4B illustrates a top view and FIGS. 4C and 4D illustrate side view of the growth basket. As is disclosed above, the growth basket is configured, e.g., sized and shaped, to be operatively secured within a growth basket receptacle to facilitate the growth of a plant that is placed in the growth basket 430. The growth basket 430 includes a sidewall 431, e.g., a substantially round sidewall, and a plurality of sidewall fluid apertures, e.g., fluid aperture 432a, to enable the passage of a liquid into the interior of the growth basket 430, e.g., to the roots of a plant that is placed in the basket. Similarly, the bottom wall 433 includes fluid apertures, e.g., fluid aperture 434a, to enable the passage of an aqueous liquid through the bottom wall 433. The sidewall fluid apertures are uniformly distributed around the entire sidewall 431 to enable the flow of liquid through the basket sidewall, e.g., through the entire sidewall. As illustrated, the sidewall fluid apertures are generally elongate, e.g., slots having a length the exceeds the width of the apertures, although it will be appreciated that fluid apertures having a variety of shapes may be utilized in the sidewall as well as in the bottom wall. Further, as illustrated in FIGS. 4A-4D, the sidewall 431 tapers inwardly from the top rim 440 down to the bottom wall 433.

The growth basket 430 illustrated in FIGS. 4A-4D also includes an attachment element that is configured to secure the growth basket within a growth basket receptacle. See FIG. 10. As illustrated in FIGS. 4A-4D, the attachment element 438 comprises a tab, e.g., a projection or protuberance, that is disposed on the top rim 440 of the growth basket 430, e.g., the tab extends downwardly from the top rim of the growth basket. As illustrated in FIG. 1C, the tab is configured to operatively mate with a notch formed on an upper edge of a growth basket receptacle to secure the growth basket within the growth basket receptacle. That is, the tab is spaced away from the sidewall 431 along an upper rim of the sidewall, creating a gap 441 between the tab and the sidewall. The corresponding notch may be mated with, e.g., placed within, the gap 441 to secure the basket to the receptacle. Providing the attachment element 438 on a top rim of the growth basket in this manner advantageously reduces the likelihood that the growth basket will be partially or wholly separated from the growth basket receptacle, e.g., by the weight of a large and horizontally-extending plant contained in the growth basket.

FIGS. 5A-5D illustrate another embodiment of a growth basket according to the present disclosure. Specifically, FIG. 5A illustrates a perspective view of a growth basket 530, FIG. 5B illustrates a top view, and FIGS. 5C and 5D illustrate side views. The growth basket 530 illustrated in FIGS. 5A-5D includes similar features as that growth basket 430 illustrated in FIGS. 4A-4D, including a sidewall 531 having a plurality of sidewall fluid apertures, e.g., aperture 532a, and a bottom wall 533 having a plurality of bottom wall fluid apertures, e.g., aperture 534a. An attachment element 539 extends from the top rim 540 as is described with respect to growth basket 430.

Figure 7:
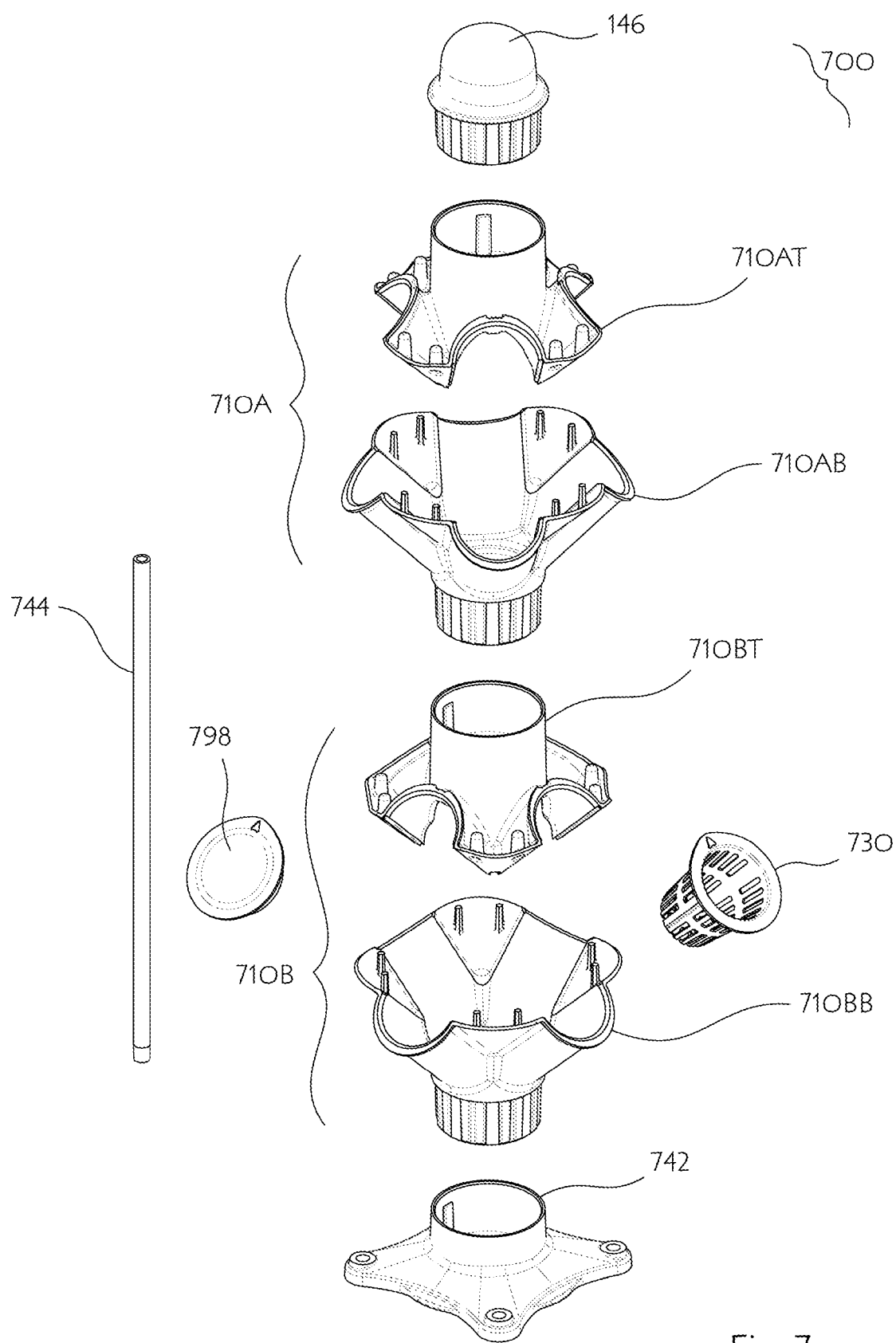
FIG. 7 illustrates an exploded view of a plant growth structure according to an embodiment of the present disclosure.

In the embodiment illustrated in FIGS. 5A-5D, the growth basket 530 includes flanges 536a/536b that are disposed along an exterior surface of the growth basket sidewall 531. As illustrated in FIGS. 5A-5D, the flanges are disposed on opposites sides of the growth basket sidewall 531. Stated another way, where the sidewall has a substantially circular cross-section, the flanges 536a/536b are separated by about 180° around the periphery of the sidewall 531. As is illustrated in FIG. 7, the flanges 536a/536b are particularly configured, e.g., sized and shaped, to be placed within seams that disposed in the growth basket receptacles. Further, the sidewall 531 tapers inwardly from the top rim 540 down to the bottom wall 533. Therefore, the flanges 536a/536b increase in width as the flanges extend from the top rim 540 towards the bottom wall 533.

The flanges 536a/536b provide at least two important benefits when the growth baskets are placed within a mating growth basket receptacle, e.g., a growth basket receptacle having mating seams. For example, the flanges 536a/536b secure the growth basket 530 within the growth basket receptacle, e.g., by preventing rotation and/or angular displacement of the growth basket relative to the growth basket receptacle. Further, because the flanges 536a/536b extend into the seams extending along the growth basket receptacles, the flanges advantageously redirect aqueous liquid into the growth basket 53, e.g., guides the aqueous liquid down the sidewall of the growth basket rather than flowing away from the growth basket.

The growth basket 530 also includes an additional feature that may enhance the use of water by a plant growing structure incorporating the growth baskets. As illustrated in FIGS. 5A-5D, a portion 535 of the growth basket sidewall 531 is substantially devoid of fluid apertures. That is, the sidewall portion 535 is essentially solid so that a liquid cannot pass into or out of that portion of the sidewall. In one characterization, the portion that is substantially devoid of fluid apertures is substantially contiguous and covers at least about 10% of the growth basket sidewall, such as at least about 12.5% of the sidewall, or even at least about 15% of the sidewall. Similarly, the bottom wall 533 includes a portion 539 that is substantially adjacent the sidewall portion 535 and is also devoid of fluid apertures. In one characterization, the bottom wall portion that is substantially devoid of fluid apertures is substantially contiguous and covers at least about 10% of the growth basket bottom wall, such as at least about 12.5% of the bottom wall, or even at least about 15% of the bottom wall. In this manner, the portions 535/539 form a cup in the lower interior of the growth basket 530 that may retain an aqueous liquid, e.g., when the growth basket 530 is placed in a growth basket receptacle with the portions 535/539 being oriented at the bottom of the growth basket interior. Such a feature is particularly useful for plants that may require more water by trapping the water within that lower portion of the growth basket 530.

Figure 6A:
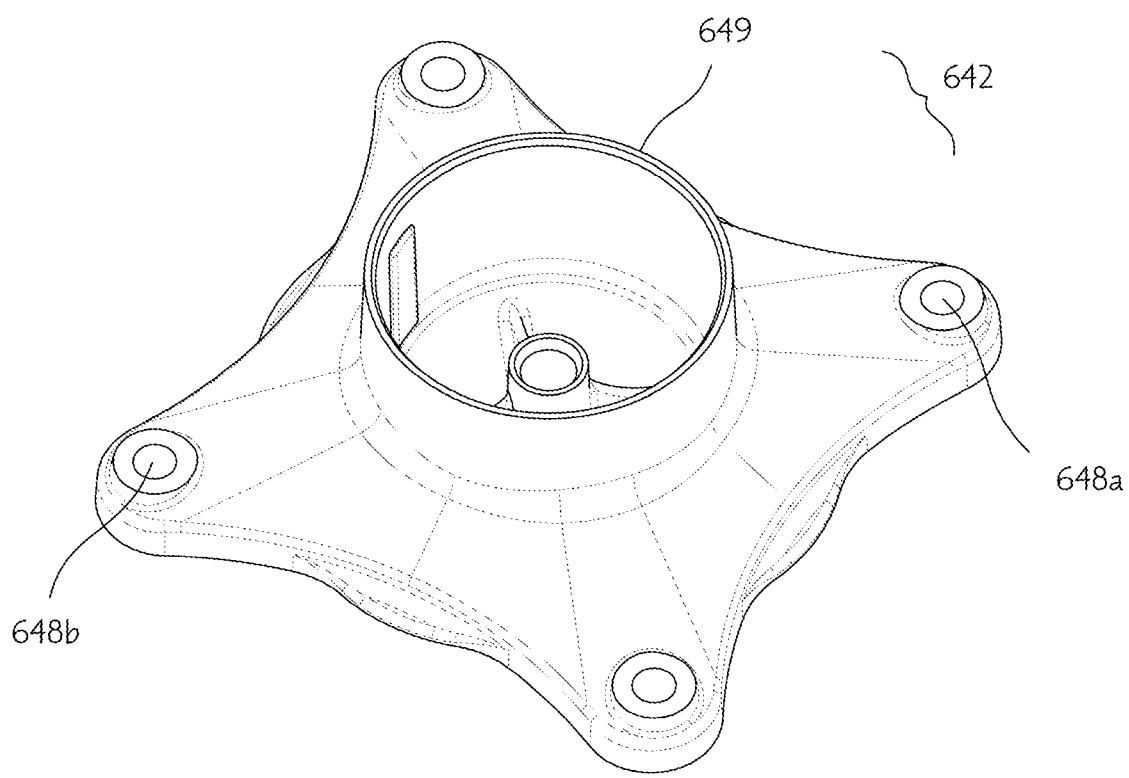
FIGS. 6A-6B illustrate an embodiment of a base module according to an embodiment of the present disclosure.
Figure 6B:
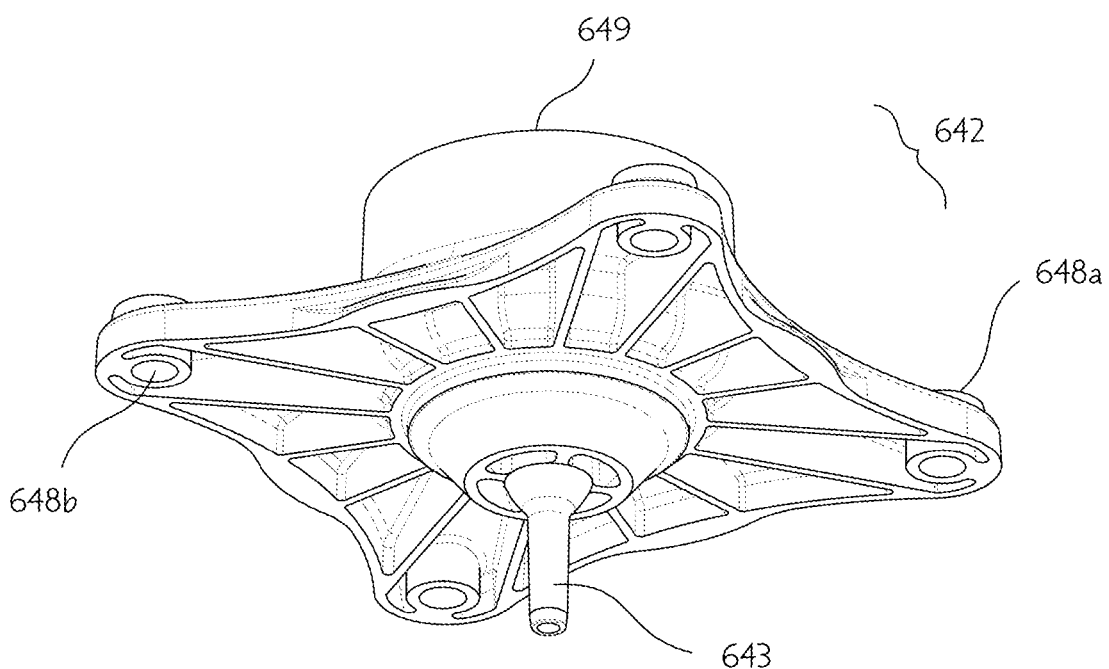

FIGS. 6A-6B illustrate an embodiment of a base module according to an embodiment of the present disclosure. The base module 642 is configured to support one or more planter modules that are vertically disposed above the base module. In this regard, the base module 642 includes an upwardly extending central section 649 that is configured, e.g., sized and shaped, to operatively attach to a lower central section of a planter module. See FIGS. 1A-1B. The base module includes attachment apertures, e.g., apertures 648a/648b, e.g., to accommodate a fastener such as a bolt therethrough to secure the base module 642, and a plant growth structure supported by the base module, to an underlying surface. The underlying surface may be, for example, a large tank containing an aqueous liquid for feeding the plants. In this regard, the base module 642 includes a liquid feed inlet 643 that is configured to receive an aqueous fluid, e.g., that is pumped through the inlet. The inlet 643 may be in fluid communication with a liquid feed tube that delivers the aqueous liquid to the fluid conduit for delivery to the plants. See FIG. 1C.

FIG. 7 illustrates and exploded view of a plant growth structure 700 according to an embodiment of the present disclosure. The components illustrated in FIG. 7 may be provided to a consumer as a kit for the construction of the plant growth structure, e.g., in a modular fashion. The plant growth structure 700 includes two planter modules 710A and 710B that are fabricated from two sections 710AT/710AB and 710BT/710BB, respectively. A cap 746 is attached over the planter module 710A and a base module is attached to the bottom of the planter module 710B. One or more growth baskets, e.g., growth basket 730, are provided for placement in a growth basket receptacle. In addition, one or more receptacle lids, e.g., receptacle lid 798, are provided. The receptacle may advantageously be placed over growth basket receptacles that are not is use, e.g., do not contain a plant, to reduce noise emanating from the fluid movement within the structure and/or to reduce evaporation of an aqueous solution that is moving through the structure.

Figure 8A:
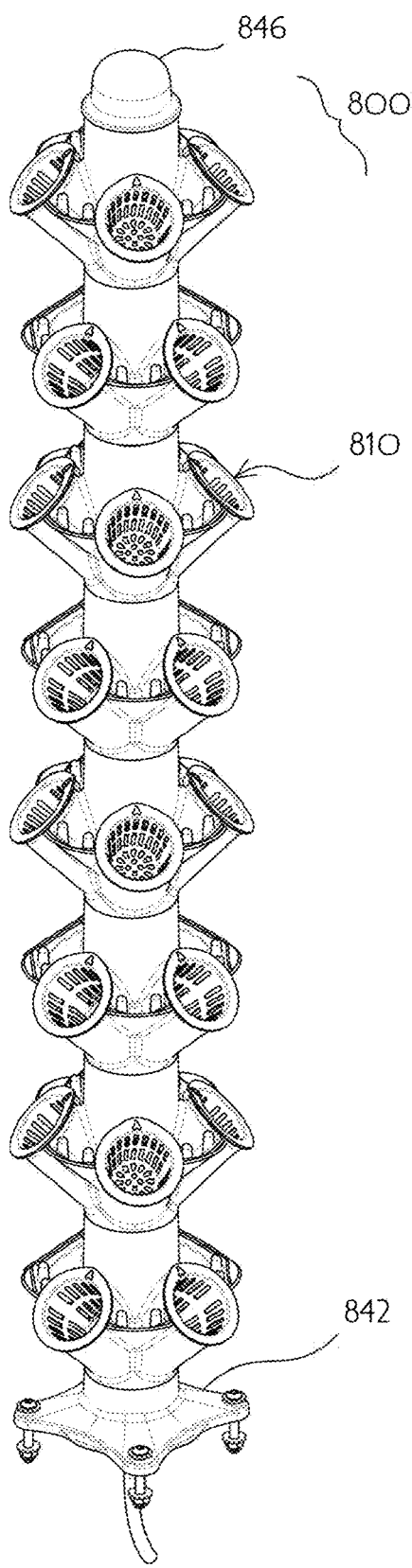
FIGS. 8A-8B illustrate an embodiment of a plant growth structure according to an embodiment of the present disclosure.
Figure 8B:
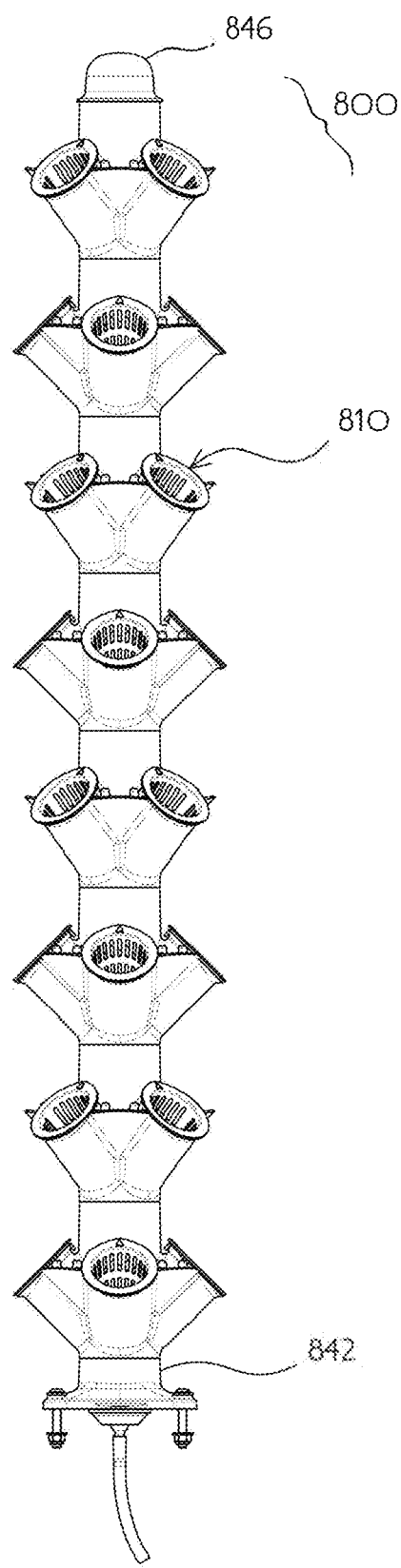

FIGS. 8A and 8B illustrate perspective views of a plant growth structure 800 according to an embodiment of the present disclosure. The plant growth structure includes eight planter modules, e.g., planter module 810, that are attached to a base module. A cap 846 is attached to a top planter module to seal the central section of the plant growth structure. As illustrated in FIGS. 8A and 8B, the growth basket receptacles of vertically-adjacent planter modules are angularly displaced in the vertical plane, e.g., by about 45°.

Figure 9:
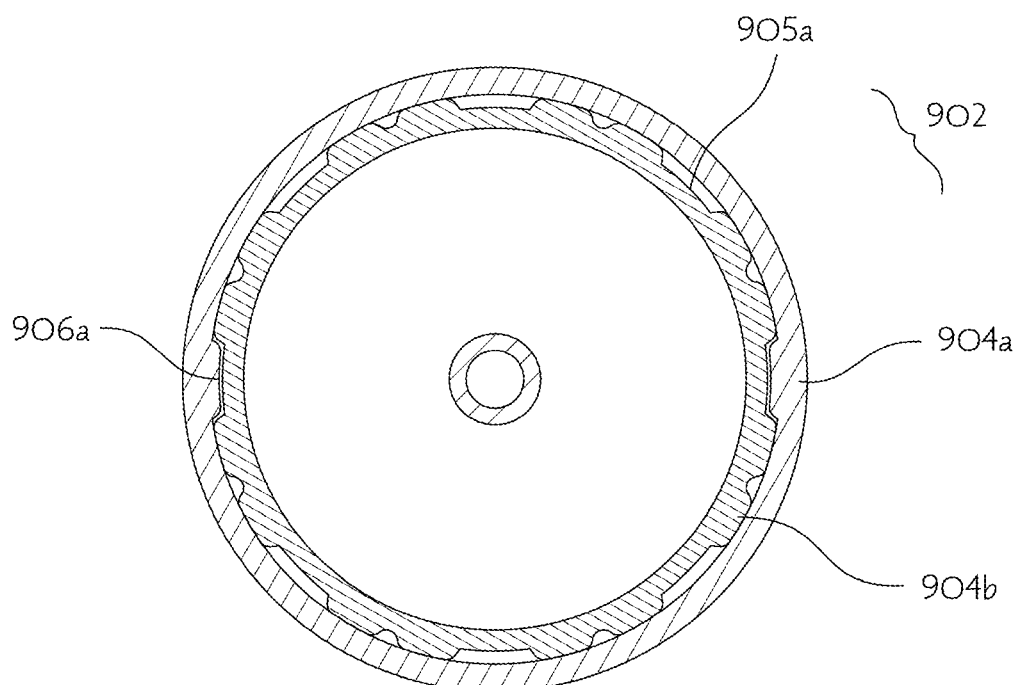
FIG. 9 illustrates a cross-sectional view of a central section of a plant growth structure module according to an embodiment of the present disclosure.

FIG. 9 illustrates a cross-sectional view of a central section 902 of a module, e.g., a planter module, that facilitates the angular displacement of the vertically-adjacent modules. The central section 902 includes an outer sidewall 904a and an inner sidewall 904b, e.g., where the inner sidewall 904b a component of a first planter module and the outer sidewall 904a is a component of a second planter module that is attached to the first planter module in vertically-spaced relation. The inner sidewall 904*b* includes a plurality of notches, e.g., notch 905*b*, that are disposed around the periphery of the sidewall 904*b*. The notches are configured to mate with one or more splines, e.g., spline 906*a*, disposed on an interior surface of the outer sidewall 904*a*. As can be seen in FIG. 9, the angular displacement of the two planter modules may be set to pre-determined angles by selecting the notches in the inner sidewall 904*b* that engage the splines. In one characterization, the notches are offset on a circular central section by about 45°, e.g., as illustrated in FIGS. 8A-8B.

Figure 10:
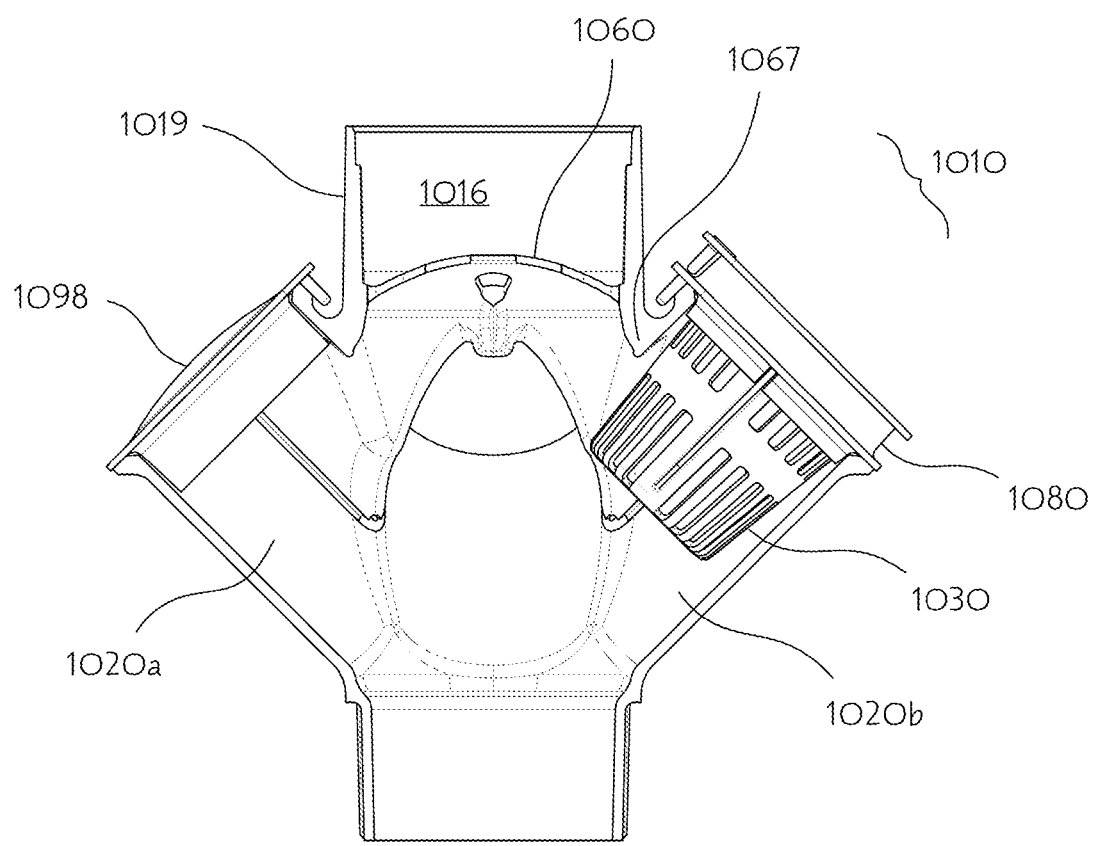
FIG. 10 illustrates a partial cross-section of a planter module and a growth basket spacer according to an embodiment of the present disclosure.

FIG. 10 illustrates a partial cross-sectional view of a planter module 1010 according to an embodiment. The planter module 1010 illustrates several features that may be incorporated into the plant growth systems and planter modules disclosed herein.

For example, FIG. 10 illustrates a cross-section of a flow guide 1067, specifically a projection extending outwardly from the fluid conduit 1016, e.g., extending outwardly from the interior of the sidewall 1019. See also FIG. 2B. The flow guide 1067 is aligned with, e.g., is disposed over, an inner top edge of the plant growth basket receptacle 1020*b* where the receptacle joins the sidewall 1019 of the central section. According to this embodiment of the present disclosure, a majority of the aqueous liquid that is fed to the growth baskets contained in the growth basket receptacles travels downwardly along, e.g., in contact with the interior of the sidewalls, e.g., along a an outer surface of the fluid conduit. The flow guide 1067 may advantageously direct the aqueous liquid to the growth basket receptacles that are vertically aligned with the flow guide. In one construction, and as illustrated in FIG. 10, the flow guide 1067 is aligned with, e.g., disposed under an aperture in a flow direction plate 1060 that is positioned above the flow guide.

FIG. 10 also illustrates a growth basket receptacle cap 1098 that is operatively disposed over the growth basket receptacle 1020*a*, e.g., when no plant is growing within the receptacle 1098. The cap 1098 is particularly useful for reducing the amount of noise that is caused by the internal flow of an aqueous liquid through the plant growth structure. Further, the cap is useful for reducing evaporation of an aqueous liquid, e.g., when the plant growth structure is in use but the plant growth receptacle 1020*a* is not being utilized for plant growth.

Further, FIG. 10 illustrates the use of a growth basket spacer 1080 that is positioned over a top edge of the growth basket receptacle 1020*b* and under the rim of the growth basket 1030. For example, in the embodiment illustrated in FIG. 10, the growth basket spacer 1080 may be in the form of a thick washer, e.g., a round body with an aperture therethrough. The growth basket spacer 1080 causes the bottom end of the growth basket 1030 to move towards the inner sidewall of the central section, thereby reducing the amount of liquid that falls upon the growth basket. In this manner, the growth basket spacer 1080 may be used with a plant that requires a reduced amount of aqueous liquid as compared to other plants in the plant growth structure.

According to one embodiment of the present disclosure, a plant growth structure, e.g., a kit for constructing a plant growth structure, may be provided with one or more components that enhance the ability of the structure to grow healthy plants, including larger plants. Such components may be provided individually or in any combination.

Figure 11:
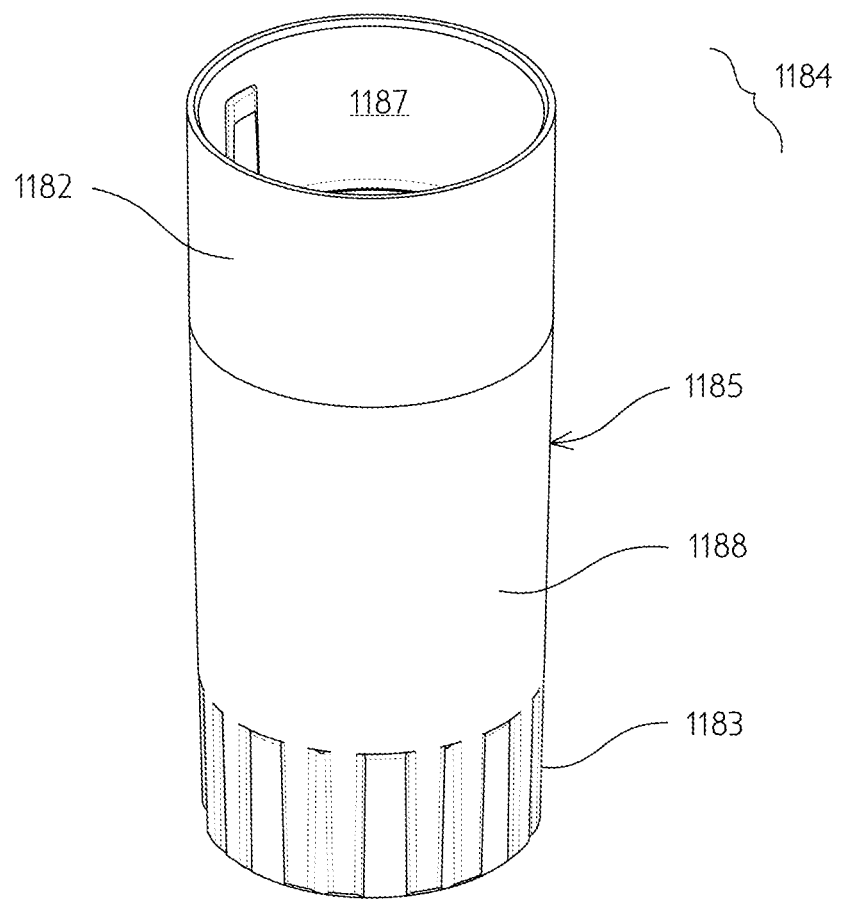
FIG. 11 illustrates a perspective view of a riser module according to an embodiment of the present disclosure.

FIG. 11 illustrates a riser module according to one embodiment. The riser module 1184 is configured to operatively and securely attach to at least the bottom end of a planter module, e.g., operatively attached to a first planter module above the riser module 1184 and attached to a second planter module below the riser module 1184. In this regard, the riser module includes a central section 1185 having a bottom end 1182 and a top end 1183. The ends 1182/1183 are configured to operatively attach to vertically-adjacent planter modules, e.g. in a manner similar to that described above for adjacent planter modules. The sidewall 1188 defines an interior fluid conduit 1187 for the passage of a liquid therethrough. Of note, the riser sidewall 1188 is free from growth basket receptacles, e.g., so that plants are not grown directly on the riser module. In this manner, when the riser module 1184 is placed between two planter modules in a plant growth structure, the lower planter module will have additional space above the planter module, e.g., to facilitate larger plants and/or to increase the amount of light that reaches plants in the lower planter module. In addition, the riser module may be placed directly between a base module and a planter module to elevate the plant growth receptacles above the base module for ease of access to plants growing therein.

Figure 12A:
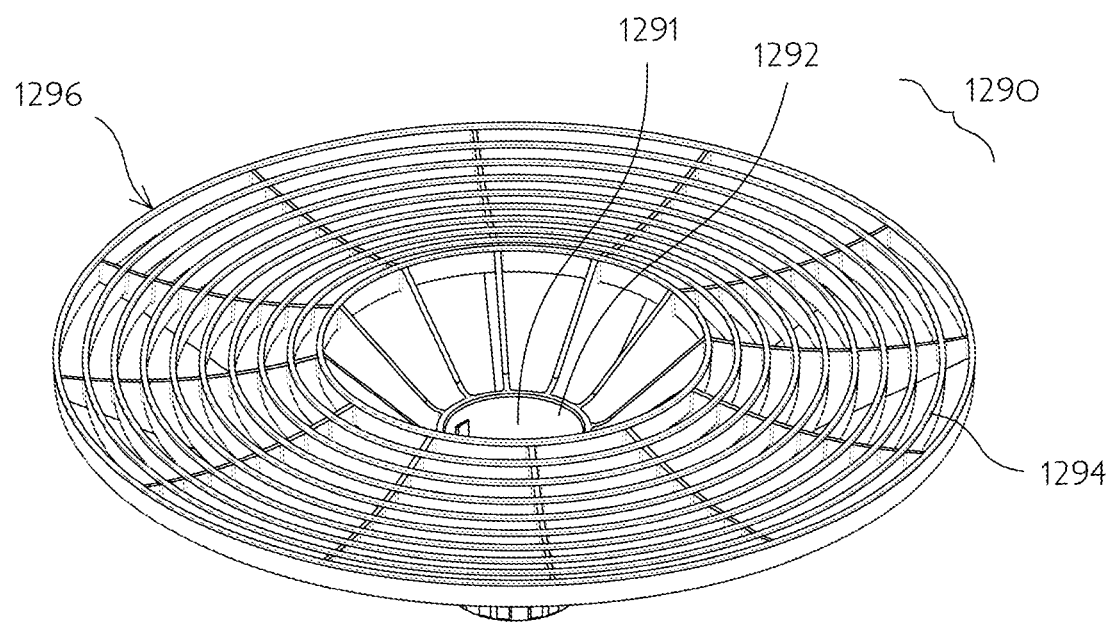
FIGS. 12A-12B illustrate an embodiment of a plant support module according to an embodiment of the present disclosure.
Figure 12B:
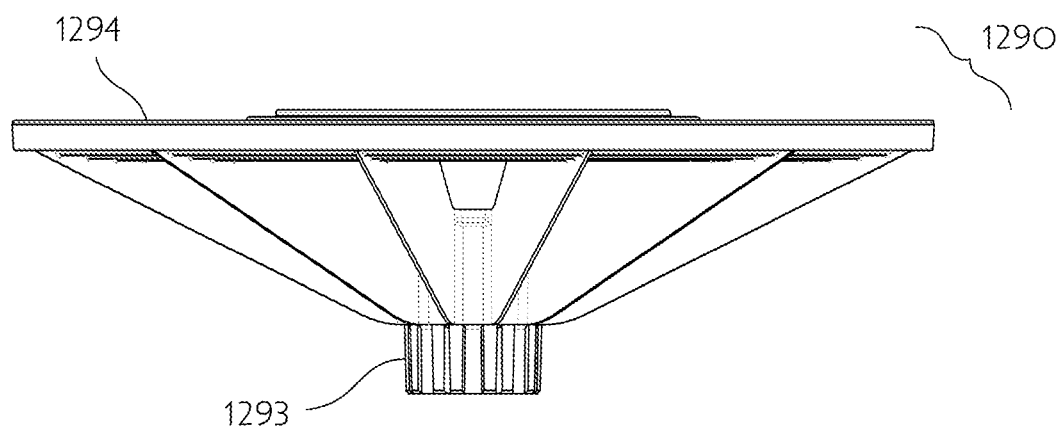

FIGS. 12A-12B illustrate a plant support module 1290 according to another embodiment of the present disclosure. The plant support module 1290 includes a central section 1291 having a top end 1292, a bottom end 1293 and an outer wall defining an interior fluid conduit for the passage of a liquid therethrough. A plant support tray 1296 is operatively disposed around a periphery of the central section 1291. The plant support tray 1296 includes a top surface 1294 that extends outwardly from the central section 1291 and is configured to support portions of a plant upon the top surface 1294. As with the riser module, the central section 1291 is configured to operatively and securely attach to the bottom end of a planter module. The top surface 1294 may be flat, and in one characterization the top surface 1294 of the plant support tray 1296 is concave to facilitate the support of a plant and/or its fruit or vegetables thereon.

Figure 13:
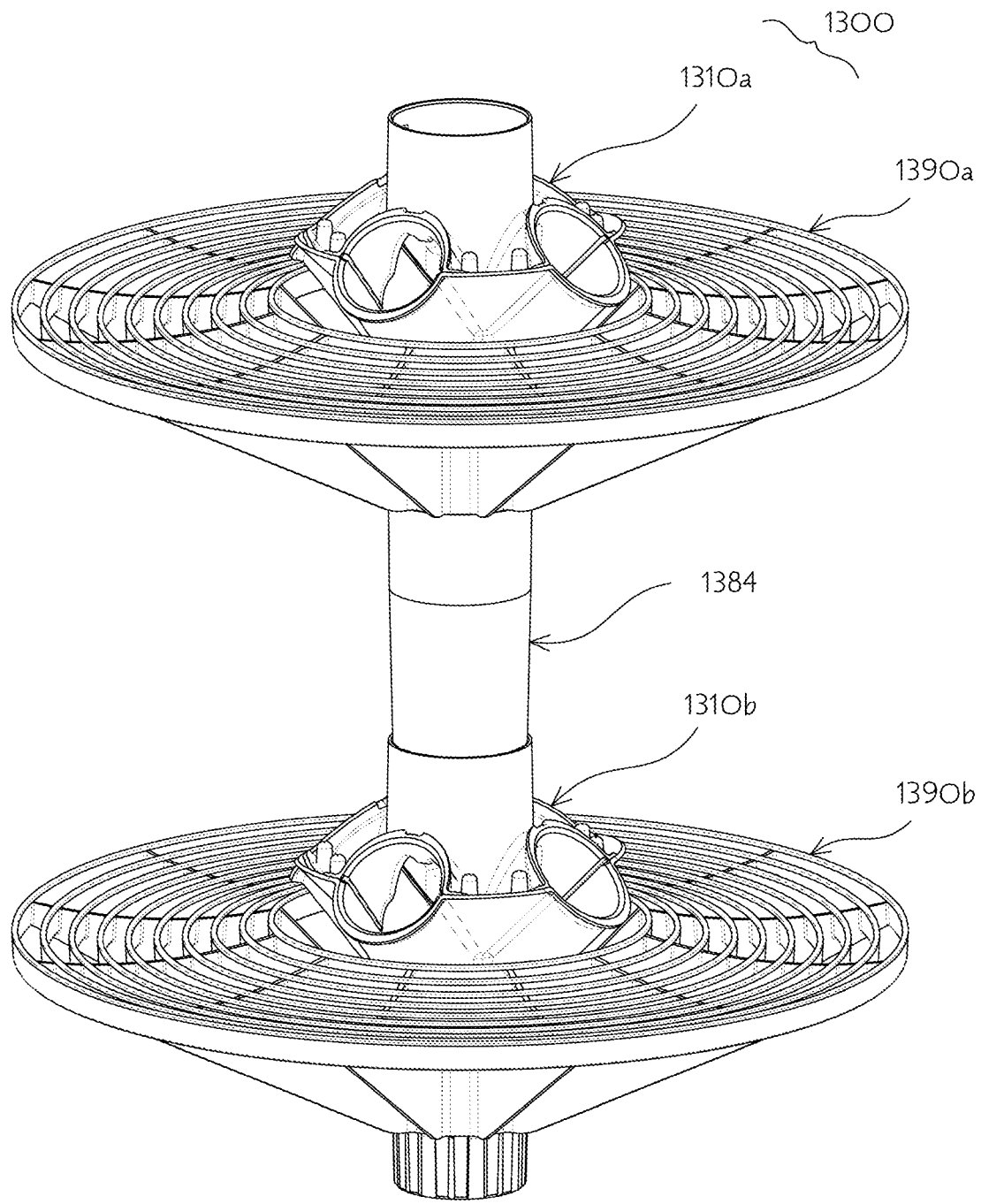
FIG. 13 illustrates a perspective view of a portion of a plant growth structure incorporating a riser module and two plant support modules according to an embodiment of the present disclosure.

FIG. 13 illustrates a portion of a plant growth structure 1300 that includes several modules in combination. Specifically, the structure 1300 includes a two planter modules 1310*a*/1310*b*, e.g., as described above. A plant support module 1390*b* is operatively attached to the bottom end of the planter module 1310*b*. The structure also includes a second planter module 1310*a* having a second plant support module 1390*a* attached to a bottom end of the planter module 1310*a*. A riser module is operatively attached to the top end of the planter module 1310*b* and the bottom end of the plant support module 1390*a* to separate the planter modules and the plant support modules, e.g., to provide easier access to and increased light to plants that are growing in the planter module 1390*b*.

The embodiments of a plant growth structure, the components of a plant growth structure and the elements of a plant growth structure may provide numerous advantages in relation to existing plant growth structures. For example, embodiments of the plant growth structure that implement a modular construction of the plant growth structure, e.g., by a consumer, may enable the individual modules to be dis-assembled and cleaned if necessary, e.g., in a powered dishwasher. The consumer may then re-assemble the plant growth structure, either in the same configuration or in a different configuration, e.g., for the growth of different types of plants.

The foregoing embodiments of a plant growth structure, elements of a plant growth structure and components of a plant growth structure may be implemented in any combination. For example, the plant growth structures may implement any one or several of the components disclosed herein, including the planter modules, riser modules, plant support modules, growth baskets, growth basket spacers, and growth basket receptacle lids. These combinations of different components may be supplied as an assembled unit or may be supplied as a kit containing several of the components, e.g., for assembly by a consumer.

The various growth structure elements, such as the flow direction plate, flow direction plate apertures, the flow guide, the growth basket flanges, the fluid capture apertures and other elements may be implemented individually or in any combination. These elements improve the liquid flow through the liquid conduit and may reduce to overall consumption of the aqueous liquid by the system.

While various embodiments of a plant growth system have been described in detail, it is apparent that modifications and adaptations of those embodiments will occur to those skilled in the art. However, is to be expressly understood that such modifications and adaptations are within the spirit and scope of the present disclosure.

What is claimed is:

1. A plant growth structure comprising a plurality of planter modules, at least a first planter module of the plurality of planter modules comprising:
    a central section having a top end, a bottom end and an outer wall defining an interior fluid conduit therethrough for the passage of a liquid, and;
    at least three growth basket receptacles disposed in a substantially horizontal plane around a periphery of the central section, the growth basket receptacles having an outer diameter and being configured so that when a growth basket is placed in a growth basket receptacle, at least a lower portion of the growth basket is in fluid communication with the fluid conduit, wherein the peripheral density of the growth basket receptacles disposed around the central section is at least 0.6; and
    a plurality of growth baskets operatively secured in the growth basket receptacles, wherein the growth baskets comprise a plurality of sidewall fluid apertures disposed in a basket sidewall to enable the flow of liquid through the basket sidewall,
    wherein a lower portion of the growth basket sidewall adjacent the bottom wall of at least one growth basked of the plurality of growth baskets is substantially devoid of fluid apertures to retain liquid in the lower interior portion of the at least one growth basket.

2. The plant growth structure recited in claim 1, wherein the first planter module comprises four growth basket receptacles disposed around the periphery of the central section in the horizontal plane.

3. The plant growth structure recited in claim 1, wherein the peripheral density of the growth basket receptacles disposed around the central section is at least 0.8.

4. The plant growth structure recited in claim 1, wherein the growth baskets comprise an attachment element that is configured to secure the growth basket in the growth basket receptacle.

5. The plant growth structure recited in claim 4, wherein the attachment element is disposed on a top rim of the growth basket and proximate to the central section when the growth basket is operatively placed in the growth basket receptacle.

6. The plant growth structure recited in claim 5, wherein the attachment element comprises a tab extending from the top rim of the growth basket and wherein the growth basket receptacle comprises a notch that is configured to receive the tab to secure the growth basket in the growth basket receptacle.

7. The plant growth structure recited in claim 1, wherein the sidewall fluid apertures comprise a plurality of vertically disposed slots formed in the sidewalls.

8. The plant growth structure recited in claim 1, further comprising a plurality of bottom wall fluid apertures disposed through a bottom wall of the growth basket.

9. The plant growth structure recited in claim 1, wherein a portion of the bottom wall adjacent the lower portion of the sidewall is devoid of bottom wall apertures to retain liquid in the lower interior portion of the at least one growth basket.

10. The plant growth structure recited in claim 1, wherein the first planter module is formed from a top planter module section and a bottom planter module section that are operatively attached to form the first planter module.

11. The plant growth structure recited in claim 1, further comprising at least a first growth basket spacer disposed over a top surface of the growth basket receptacle and a growth basket placed over the growth basket spacer.

12. The plant growth structure recited in claim 1, wherein the central section comprises a flow direction plate extending across the interior fluid conduit.

13. The plant growth structure recited in claim 12, wherein the flow direction plate comprises a substantially convex upper surface.

14. The plant growth structure recited in claim 12, wherein the flow direction plate comprises a plurality of fluid apertures disposed along an outer periphery of the flow direction plate, wherein the fluid apertures are aligned with a growth basket receptacle.

15. The plant growth structure recited in claim 14, wherein the fluid apertures have a teardrop shape.

16. The plant growth structure recited in claim 12, wherein the flow direction plate comprises a central aperture configured to allow a feed pipe to pass therethrough.

17. The plant growth structure recited in claim 1, further comprising at least a second planter module disposed above the first planter module.

18. The plant growth structure recited in claim 17, wherein:
    the first planter module and the second planter module comprise the same number of growth basket receptacles; and
    the growth basket receptacles of the first planter module and the second planter module are substantially aligned in the vertical plane.

19. The plant growth structure recited in claim 17, wherein:
    the first planter module and the second planter module comprise the same number of growth basket receptacles; and
    the growth basket receptacles of the first planter module and the second planter module are angularly offset in the vertical plane.

20. The plant growth structure recited in claim 19, wherein:
    the first planter module comprises four growth basket receptacles separated by 90° around the periphery of the first planter module central section; and
    the second planter module comprises four growth basket receptacles separated by 90° around the periphery of the second planter module central section,
    wherein the growth basket receptacles of the first planter module are offset from the growth basket modules of the second planter module by 45° in the vertical plane.

21. The plant growth structure recited in claim 19, wherein:
the first planter module comprises three growth basket receptacles separated by 120° around the periphery of the first planter module central section; and
the second planter module comprises three growth basket receptacles separated by 120° around the periphery of the second planter module central section,
wherein the growth basket receptacles of the first planter module are offset from the growth basket modules of the second planter module by about 60° in the vertical plane.

22. A plant growth structure comprising a plurality of planter modules, at least a first planter module of the plurality of planter modules comprising:
a central section having a top end, a bottom end and an outer wall defining an interior fluid conduit therethrough for the passage of a liquid, and
at least three growth basket receptacles disposed in a substantially horizontal plane around a periphery of the central section, the growth basket receptacles having an outer diameter and being configured so that when a growth basket is placed in a growth basket receptacle, at least a lower portion of the growth basket is in fluid communication with the fluid conduit, wherein the peripheral density of the growth basket receptacles disposed around the central section is at least 0.6,
wherein the first planter module is formed from a top planter module section and a bottom planter module section that are operatively attached to form the first planter module, and
wherein the top planter module section and the bottom planter module section are operatively attached by sliding a plurality of pin receptacles disposed in one of the planter module sections over a plurality of vertically extending pins disposed in the other planter module section.

23. The plant growth structure recited in claim 22, wherein the top planter module section and the bottom planter module section are operatively attached by sliding a plurality of pin receptacles disposed in the top planter module section over a plurality of pins disposed in the bottom planter module section.

24. The plant growth structure recited in claim 22, wherein the top planter module section and the bottom planter module section are irreversibly attached.

25. A plant growth structure comprising a plurality of planter modules, at least a first planter module of the plurality of planter modules comprising:
a central section having a top end, a bottom end and an outer wall defining an interior fluid conduit therethrough for the passage of a liquid;
at least three growth basket receptacles disposed in a substantially horizontal plane around a periphery of the central section, the growth basket receptacles having an outer diameter and being configured so that when a growth basket is placed in a growth basket receptacle, at least a lower portion of the growth basket is in fluid communication with the fluid conduit, wherein the peripheral density of the growth basket receptacles disposed around the central section is at least 0.6, wherein the first planter module is formed from a top planter module section and a bottom planter module section that are operatively attached to form the first planter module; and
two seams disposed along an interior surface of the growth basket receptacles, wherein the two seams are formed along an interface between the top section and the bottom section of the growth basket receptacles.

26. The plant growth structure recited in claim 25, wherein the structure further comprises a plurality of growth baskets that are operatively secured in the growth basket receptacles, wherein the growth baskets comprise at least a first flange disposed along an exterior of a growth basket sidewall and wherein the first flange is configured to be placed within a first seam of the growth basket receptacles.

27. The plant growth structure recited in claim 26, wherein the growth baskets comprise at least a second flange disposed along the exterior of the growth basket sidewall and wherein the second flange is configured to be placed within a second seam of the growth basket receptacles.

28. The plant growth structure recited in claim 25, wherein the top planter module section and the bottom planter module section are irreversibly attached.

* * * * *